United States Patent [19]
Miwa et al.

[11] Patent Number: 5,790,353
[45] Date of Patent: Aug. 4, 1998

[54] COMPOSITE MAGNETIC HEAD HAVING MINIMAL CROSSTALK, MAXIMAL HEAD OUTPUT AND MITIGATED SLIDING SURFACE DEFORMATION

[75] Inventors: Hiroshi Miwa; Yoshinobu Hirokado; Yuichiro Murata; Yuji Ohmura, all of Tokyo, Japan

[73] Assignee: Mitsubishi Denki Kabushiki Kaisha, Tokyo, Japan

[21] Appl. No.: 741,098

[22] Filed: Oct. 30, 1996

[30] Foreign Application Priority Data

Nov. 17, 1995 [JP] Japan ................................. 7-300213

[51] Int. Cl.$^6$ ................................................. G11B 5/265
[52] U.S. Cl. .......................... 360/125; 360/103; 360/121; 360/123
[58] Field of Search ................................. 360/103, 104, 360/119, 121, 123, 122, 125, 126

[56] References Cited

U.S. PATENT DOCUMENTS

| | | | |
|---|---|---|---|
| 5,148,342 | 9/1992 | Kato et al. | 360/121 |
| 5,148,343 | 9/1992 | Sugawara et al. | 360/122 |
| 5,181,150 | 1/1993 | Hayakawa et al. | 360/121 |
| 5,251,089 | 10/1993 | Hara | 360/121 |
| 5,450,264 | 9/1995 | Nishimura et al. | 360/121 |

FOREIGN PATENT DOCUMENTS

| | | |
|---|---|---|
| 161510 | 7/1988 | Japan . |
| 5-250625 | 9/1993 | Japan . |

*Primary Examiner*—Jefferson Evans

[57] ABSTRACT

A composite magnetic head having a head chip including an erasing core, a recording/reproducing core and a center core disposed between the erasing core and the recording/reproducing core. The erasing core is joined to the center core via a first nonmagnetic material which forms an erasing gap, and the recording/reproducing core is joined to the center core via a second nonmagnetic material which forms a recording/reproducing gap. The composite magnetic head has an erasing coil, a recording/reproducing coil, a first back bar for magnetically coupling the erasing core with the center core, and a second back bar for magnetically coupling the recording/reproducing core with the center core. The composite magnetic head satisfies both of following conditional expressions:

$$H \leq 0.058 + 8.6 \times L_g \quad \text{(expression 1)}$$

$$H \leq 0.418 + 5.9 \times L_g \quad \text{(expression 2)}$$

where $L_g$ denotes a gap-to-gap distance between the erasing gap and the recording/reproducing gap, and H denotes a head height which is a distance between a sliding surface of the head chip for being contact with the recording medium and surfaces of the first and second back bars on an opposite side of the sliding surface.

10 Claims, 23 Drawing Sheets

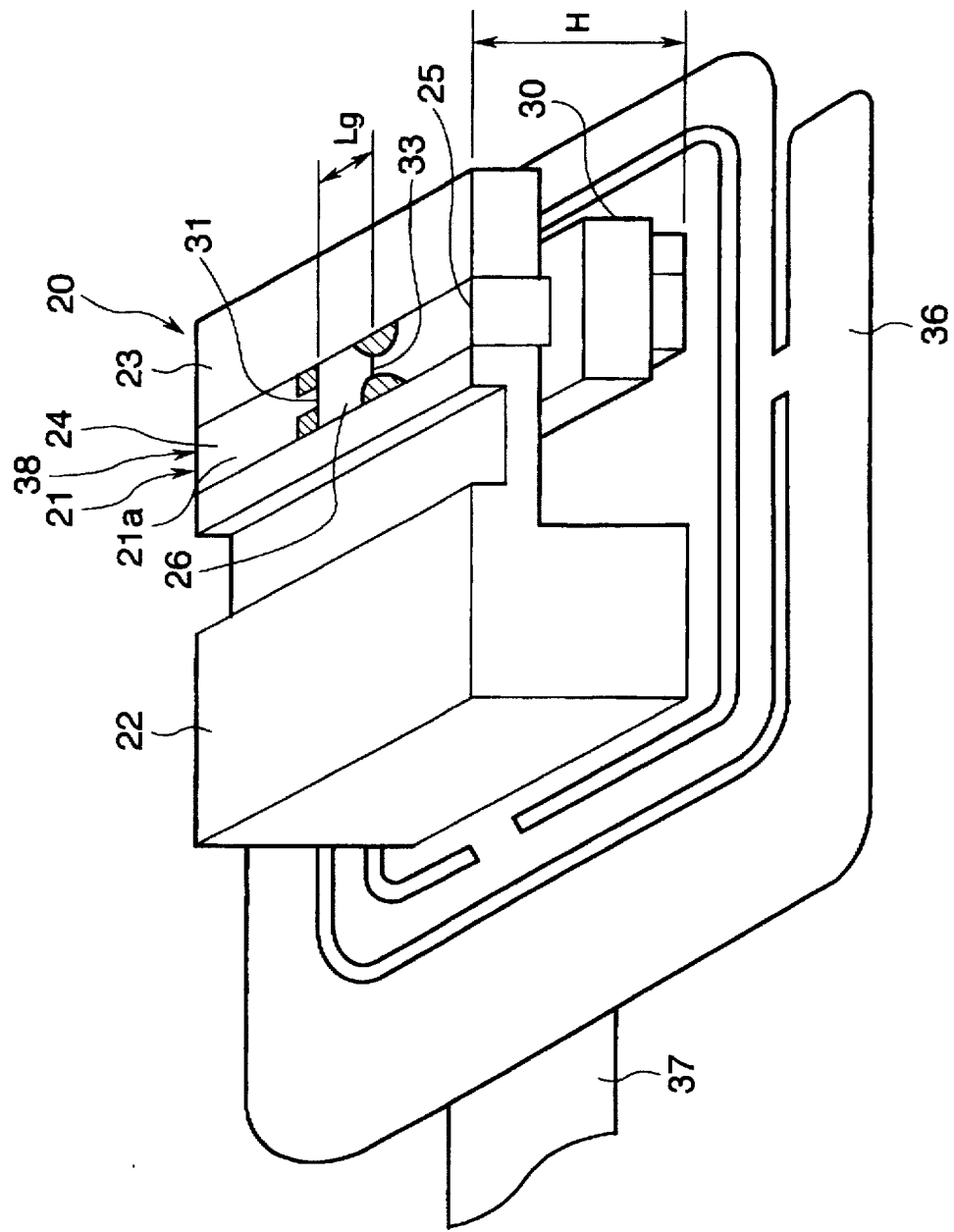

FIG. 30A
PRIOR ART
FIG. 30B
PRIOR ART
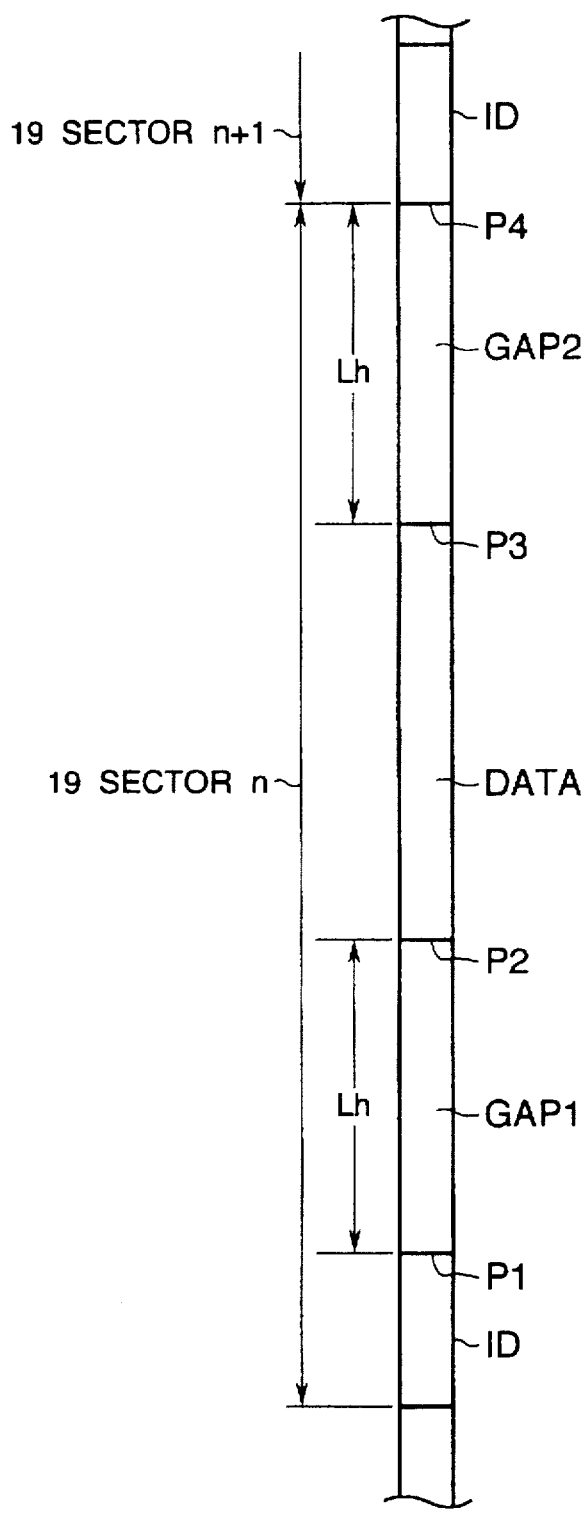
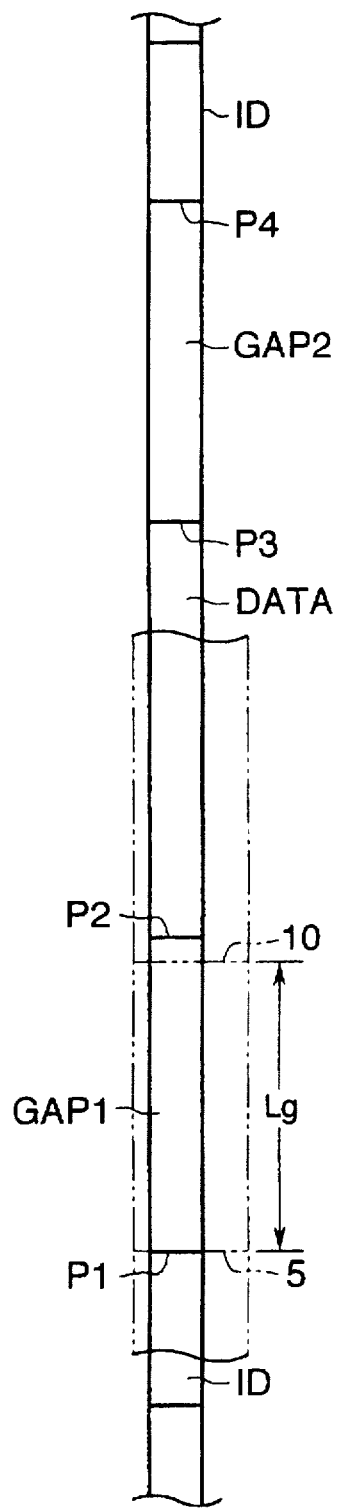

COMPOSITE MAGNETIC HEAD HAVING MINIMAL CROSSTALK, MAXIMAL HEAD OUTPUT AND MITIGATED SLIDING SURFACE DEFORMATION

BACKGROUND OF THE INVENTION

The present invention relates to a composite magnetic head for magnetically erasing, recording (or writing) and reproducing (or reading) data on a rotating flexible magnetic disk (FD), which is employed as a recording medium in personal computers, portable data terminal equipments and the like.

A conventional composite magnetic head for recording data on an FD and reproducing data from the FD is disclosed in, for example, Japanese Patent Kokai Publication No. 161510/1988. FIG. 26A is a perspective view of the composite magnetic head shown in this publication, FIG. 26B is a plan view of the composite magnetic head shown in FIG. 26A, and FIG. 27 is a perspective view showing a part of FIG. 26A.

In FIGS. 26A and 26B and FIG. 27, a reference numeral 1 denotes a recording/reproducing head, 2 denotes a window made by a penetrating hole, and 3 denotes a glass-molded part. Reference numerals 4a and 4b denote head cores made of material with high permeability such as ferrite, 5 denotes a recording/reproducing gap, and 15 denotes a recording/reproducing coil wound on the head core 4a through the window 2.

The recording/reproducing head 1 is built by the steps of: forming a nonmagnetic material layer such as $SiO_2$ on surfaces to be joined of the head cores 4a and 4b through sputtering or other method; joining the head cores 4a and 4b to form the recording/reproducing gap 5 therebetween; and filling the glass to form the glass-molded part 3, thereby reinforcing the joint.

A reference numeral 6 denotes an erasing head, 7 denotes a window made by a penetrating hole, and 8 denotes a glass-molded part. Reference numerals 9a and 9b denote head cores made of material with high permeability such as ferrite, 10 denotes an erasing gap, and 16 denotes an erasing coil wound on the head core 9a through the window 7.

The erasing head 6 is built by the steps of: forming a nonmagnetic material layer such as $SiO_2$ on surfaces to be joined of the head cores 9a and 9b through sputtering or other method; joining the cores 9a and 9b to form the erasing gap 10 therebetween; and filling the part 8 with glass to form the glass-molded part 8, thereby reinforcing the joint.

The recording/reproducing head 1 and the erasing head 6 are joined via the nonmagnetic plate 11. $L_g$ denotes a gap-to-gap distance between the recording/reproducing gap 5 and the erasing gap 10.

In FIGS. 26A and 26B, reference numerals 12 and 14 denote holders made of ceramics or other nonmagnetic material. The holders 12 and 14 are joined onto opposite sides of the recording/reproducing head 1, the erasing head 6, and the nonmagnetic plate 11. The holder 14 has a groove 13 on it.

A pair of composite magnetic heads configured as described above are brought into close contact with both sides of the FD 17, as shown in FIG. 28. The data is recorded on the FD 17 by magnetizing the layers of magnetic material deposited on both sides of the FD 17. The leakage flux escaping into the air from the magnetized layer passes through the head cores 4a and 4b of the recording/reproducing head 1 and goes across the recording/reproducing coil 15. When the FD 17 is rotated in the direction indicated by the arrow $A_1$ in this state, the leakage flux crossing the recording/reproducing coil 15 changes over time, inducing a voltage proportional to the change in the leakage flux at both ends of the coil 15. The induced voltage is processed by a circuit following a certain algorithm, and the result is sent to a computer.

When data is recorded on the FD 17, a direct current is passed through the erasing coil 16 so that the old data recorded on the FD 17 is erased by the direct-current magnetic field spreading out from the erasing gap 10 to the layer of magnetic material on the FD 17.

A magnetic flux varying with the current flowing through the recording/reproducing coil 15 escapes from the recording/reproducing gap coming after the erasing gap 10 and reaches the layer of magnetic material on the FD 17. A magnetization pattern determined by the magnetic flux of the recording/reproducing coil 15 is formed on the layer of magnetic material.

As personal computers have been scaled down, the demand for smaller flexible disk drives (FDDs) has been increasing in recent years. If a conventional composite magnetic head is used for a 1.8-inch FD having the same storage capacity (2 [MB]) as the currently typical 3.5-inch FD, the following problems occur.

As shown in FIG. 29A, a number of concentric tracks 18 are formed on the FD 17 to store data. Each track 18 is divided into several tens of sectors 19, as shown in FIG. 29B which is an enlarged view showing a part of FIG. 29A. Each sector 19 consists of the ID area, $GAP_1$ area, DATA area and $GAP_2$ area, as shown in FIG. 30A. The ID area holds the information for identifying the sector 19. The DATA area stores the data sent from a personal computer. The $GAP_1$ and $GAP_2$ areas are placed between the ID and DATA areas in order to suppress the effect of mechanical variations of the FDD.

When the data sent from a personal computer is recorded in the DATA area of a certain sector 19, the procedure described below is followed.

First, the composite magnetic head is positioned on a track. The composite magnetic head reads the ID of the sector 19 to check whether the current sector is the target sector. If the composite magnetic head is on the target sector 19, currents indicated in FIGS. 31A and 31B are immediately and respectively passed through the erasing coil 16 and the recording/reproducing coil 15 in order to record the data.

The erasing gap 10 of the composite magnetic head must erase the old data recorded in the DATA area in advance and must not overwrite or destroy the data for identifying the sector 19 recorded in the ID area. When the recording/reproducing gap 5 of the composite magnetic head is placed on the boundary $P_1$ between the ID area and the $GAP_1$ area after identifying the sector 19, the erasing gap 10 must not face the DATA area even partly. When recording of certain data in the DATA area is completed and the recording/reproducing gap 5 of the composite magnetic head is placed on the boundary $P_3$ between the DATA area and $GAP_2$ area, the erasing gap 10 must not face the ID area of the neighboring (n+1)-th sector 19 even partly. Accordingly, the gap-to-gap distance $L_g$ between the recording/reproducing gap 5 and the erasing gap 10 of the composite magnetic head must be shorter than the length $L_h$ of the $GAP_1$ area and $GAP_2$ area (i.e., $L_h > L_g$).

The 1.8-inch FD is about a half of the 3.5-inch FD in diameter (a quarter in area). This small 1.8-inch FD can attain the same storage capacity as the currently typical 3.5-inch FD, that is, 2[MB] when unformatted and 1.44 [MB] when formatted, under the following conditions:

(a) The data recording density per unit length or record line density is increased, and (b) The track density is increased.

To attain the target storage capacity when formatted, in addition to the above-mentioned conditions (a) and (b), the size of the ID area, $GAP_1$ area, and $GAP_2$ area in the sector 19 should not be increased. The length $L_h$ of the $GAP_1$ area and the $GAP_2$ area can be expressed as follows:

$$L_h = r_{min} * B_{gap} / D_l$$

where $r_{min}$ is the minimum track radius of the FD, $B_{gap}$ is the size of the $GAP_1$ and $GAP_2$ areas, and $D_l$ is the linear recording density per unit angle.

The expression indicates that the length $L_h$ decreases as the radius of the FD 17 decreases from 3.5 and 1.8 inches, or as the minimum track radius $r_{min}$ decreases. The length $L_h$ further decreases if the linear recording density $D_l$ is increased to attain the storage capacity of 2 [MB].

Accordingly, the length $L_h$ between the recording/reproducing gap 5 and the erasing gap 10 must be reduced. Since the conventional composite magnetic head shown in FIGS. 26A and 26B and FIG. 27 has the nonmagnetic plate 11 between the head cores 9b and 4b, the head cores 9b and 4b must be made thinner. This, however, decreases the mechanical strength of the composite magnetic head and makes the composite magnetic head easy to break. In addition, the magnetic reluctance of the head cores 9b and 4b increases, thereby decreasing the head output.

Supposing a simple head core with the shared center core structure, which incorporates the head cores 9b and 4b without the nonmagnetic plate 11, is used, the thin center core causes crosstalk between the recording/reproducing head 1 and the erasing head 6, thereby increasing noise.

SUMMARY OF THE INVENTION

It is an object of the present invention to provide a composite magnetic head that ensures high head output and high-quantity low-noise signals in recording and reproducing data on a 1.8-inch FD having the same storage capacity (2[MB]/1.44[MB]) as the currently typical 3.5-inch FD.

According to the present invention, a composite magnetic head has a head chip including an erasing core for magnetically erasing data from the recording medium, a recording/reproducing core for magnetically recording and reproducing data on the recording medium, and a center core disposed between the erasing core and the recording/reproducing core. The erasing core is joined to the center core via a first nonmagnetic material which forms an erasing gap, and the recording/reproducing core is joined to the center core via a second nonmagnetic material which forms a recording/reproducing gap. The composite magnetic head also has an erasing coil wound on the erasing core, a recording/reproducing coil wound on the recording/reproducing core, a first back bar for magnetically coupling the erasing core with the center core and a second back bar for magnetically coupling the recording/reproducing core with the center core.

The composite magnetic head satisfies both of following conditional expressions (1) and (2):

$$H \leq 0.058 + 8.6 \times L_g \qquad \text{(expression 1)}$$

$$H \leq 0.41 + 5.9 \times L_g \qquad \text{(expression 2)}$$

where $L_g$ denotes a gap-to-gap distance between the erasing gap and the recording/reproducing gap, and H denotes a head height which is a distance between a sliding surface of the head chip for being contact with the recording medium and surfaces of the first and second back bars on an opposite side of the sliding surface. The composite magnetic head according to the present invention can provide high output and high-quality low-noise signals in reading and recording a 1.8-inch FD having the same storage capacity as the currently typical 3.5-inch FD.

The composite magnetic head according to the present invention may also have a holder for supporting the head chip, and a gimbal for supporting the holder so as to be able to slope the sliding surface of the head chip along a width direction of the head chip and a length direction perpendicular to the width direction.

The composite magnetic head may also have a molding resin for filling a space surrounded by the head chip, the holder and the gimbal, and covering the erasing coil, the recording/reproducing coil, the first back bar and the second back bar.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a perspective view showing a composite magnetic head according to a first embodiment of the present invention;

FIGS. 30A and 30B show a sector configuration and the relationship between the gap length $L_h$ of the sector and the gap-to-gap distance $L_g$ of the head chip.

DETAILED DESCRIPTION OF THE INVENTION

Preferred embodiments will be described with reference to the accompanying drawings.

First Embodiment

Figure 2A:
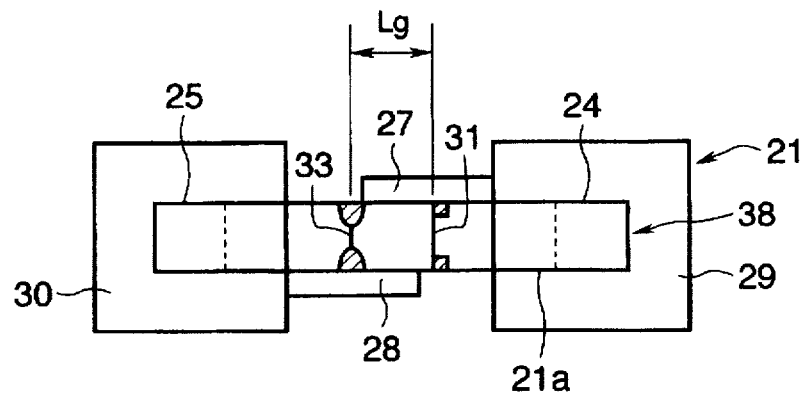
FIGS. 2A and 2B are a plan view and a side view of the head section of the composite magnetic head according to the first embodiment.
Figure 2B:
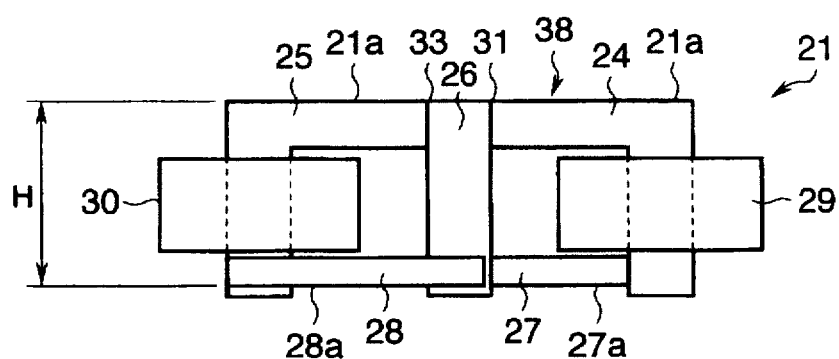

FIG. 1 is a perspective view showing a composite magnetic head of a first embodiment of the present invention, and FIGS. 2A and 2B are a plan view and a side view of the head section of the composite magnetic head shown in FIG. 1.

Figure 28:
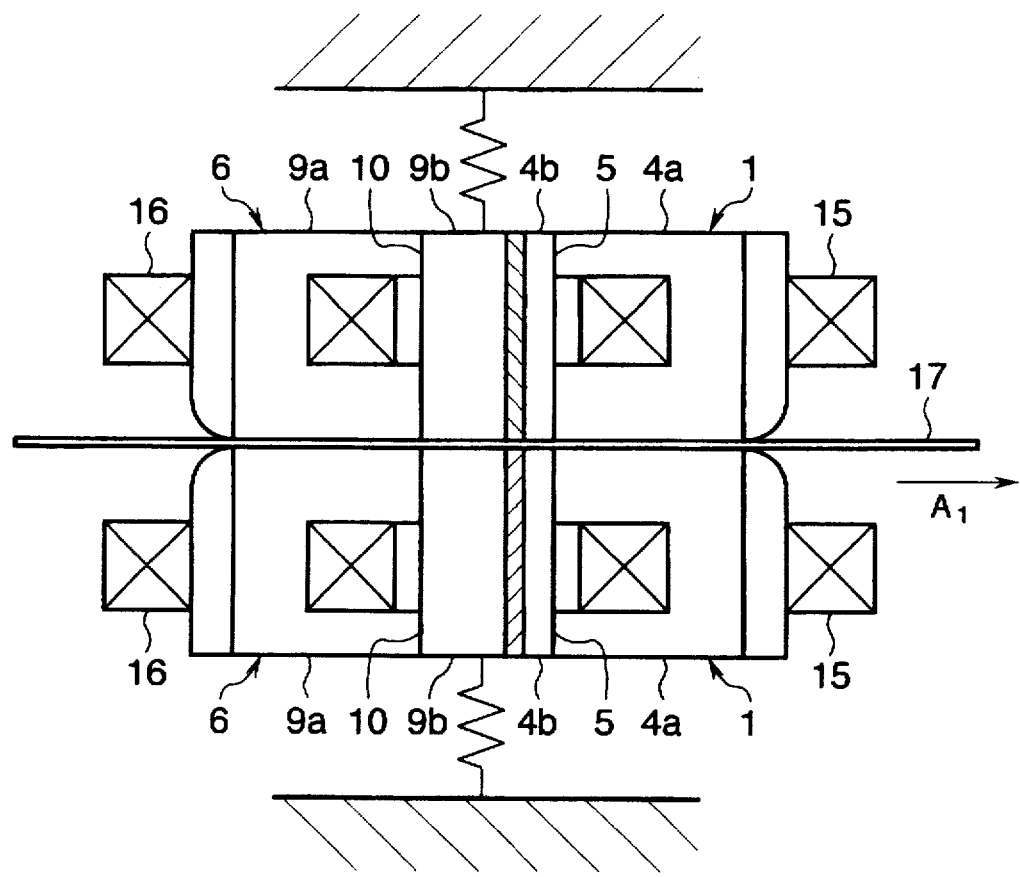
FIG. 28 is a cross sectional view showing a pair of magnetic heads in close contact with an FD.
Figure 29A:
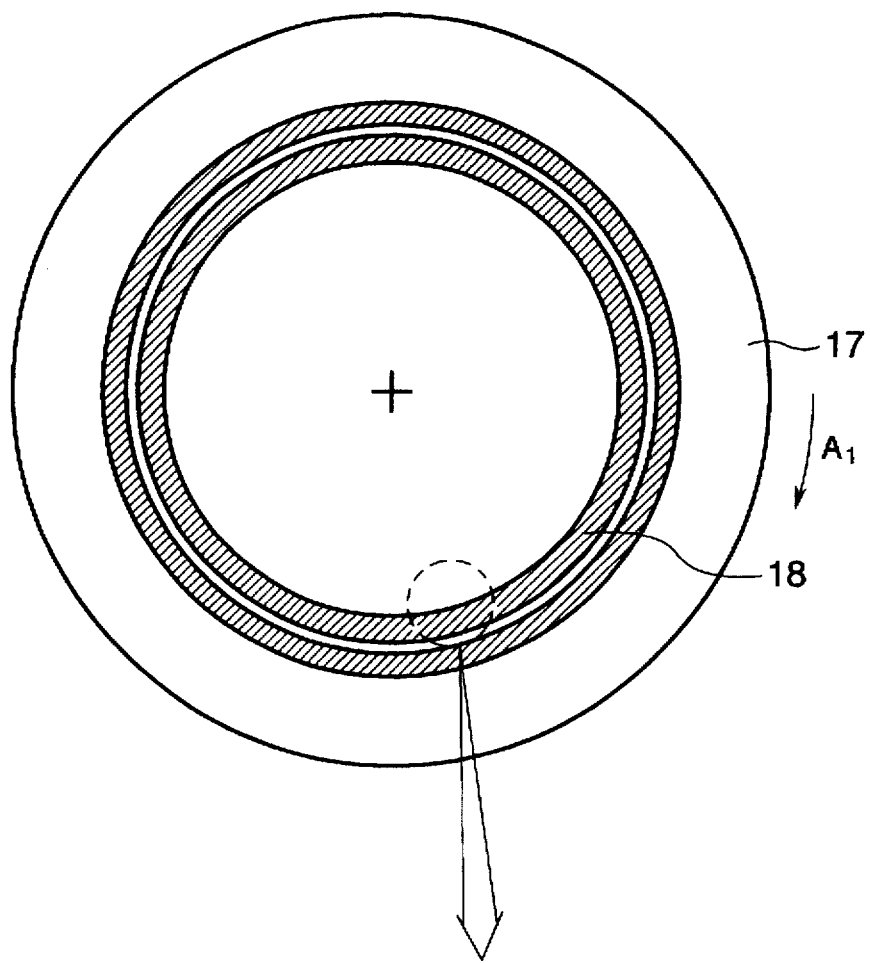
FIGS. 29A and 29B show the tracks on an FD and the sectors in the track.
Figure 29B:
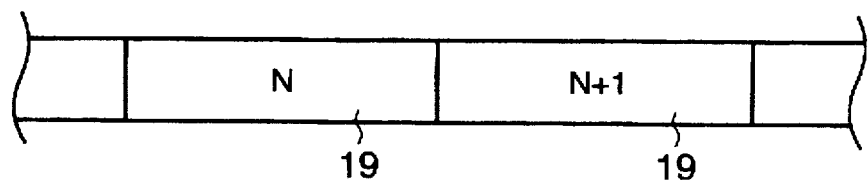

As shown in the FIGS., the composite magnetic head according to the first embodiment has a head chip 38 including an erasing core 24 for magnetically erasing data from a recording medium such as a FD (not shown in FIG. 1, but shown in FIG. 28), a recording/reproducing core 25 for magnetically recording and reproducing data on the recording medium, and a center core 26 disposed between the erasing core 24 and the recording/reproducing core 25. The erasing core 24 is joined by an adhesive to the center core 26 via a first nonmagnetic material such as $SiO_2$ which forms an erasing gap 31, and the recording/reproducing core 25 is joined by an adhesive to the center core 26 via a second nonmagnetic material such as $SiO_2$ which forms a recording/reproducing gap 33. The erasing core 24 and the recording/reproducing core 25 are magnetically connected by the center core 26.

The composite magnetic head 20 also has an erasing coil 29 wound on the erasing core 24, a recording/reproducing coil 30 wound on the recording/reproducing core 25, an erasing back bar 27 for magnetically coupling the erasing core 24 with the center core 26 and a recording/reproducing back bar 28 for magnetically coupling the recording/reproducing core 25 with the center core 26. The head chip 38, the erasing coil 29, the recording/reproducing coil 30, the erasing back bar 27 and the recording/reproducing back bar 28 forms a head section 21.

The composite magnetic head 20 satisfies both of following conditional expressions (1) and (2):

$$H \leq 0.058 + 8.6 \times L_g \quad \text{(expression 1)}$$

$$H \leq 0.41 + 5.9 \times L_g \quad \text{(expression 2)}$$

where $L_g$ denotes a gap-to-gap distance between the erasing gap 31 and the recording/reproducing gap 33, and H denotes a head height which is a distance between a sliding surface 21a of the head chip 38 for being contact with the recording medium and bottom surfaces 27a and 28a of the erasing and recording/reproducing back bars 27 and 28 on an opposite side of the sliding surface 21a. Preferably, the gap-to-gap distance $L_g$ is not more than 0.2 [mm], and the head height H is not more than 1.6 [mm].

The composite magnetic head 20 also has holders 22 and 23 for supporting the head section 21. The head chip 38 and the holders 22 and 23 forms a head slider 39, top surface of which slides on the FD. The composite magnetic head 20 also has a gimbal 36 for supporting the holder 22 so as to be able to slope the sliding surface of the head chip 38 along a width direction of the head chip 38 and a length direction perpendicular to the width direction. The composite magnetic head also has a flexible printed circuit board (FPC) 37, one end of which is stuck to the rear side of the gimbals 36 and is electrically connected to the recording/reproducing coil 30 and the erasing coil 31 (hidden in FIG. 1, but shown in FIGS. 2A and 2B) through expansion leads and the other end of which is connected to a signal processing circuit (not shown). The holders 22 and 23 are made of nonmagnetic ceramics such as barium titanate. The gimbal 36 is made of, for example, a phosphor bronze plate for spring. The gimbal 36 is formed by, for example, chemical etching.

Figure 3:
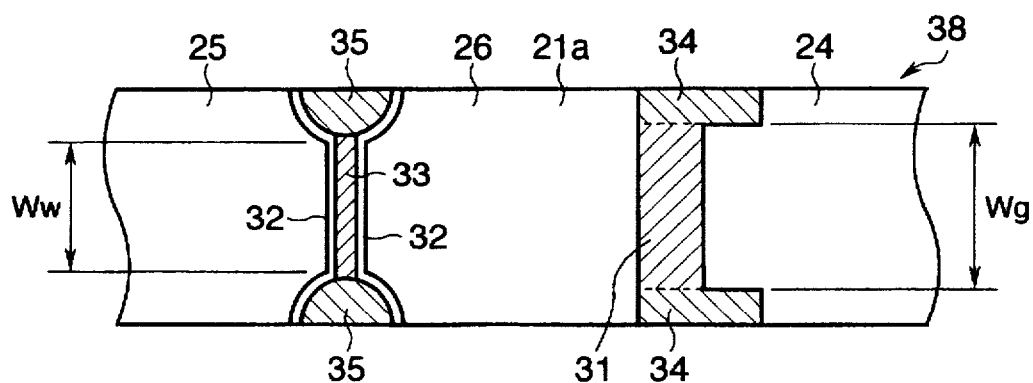
FIG. 3 is an enlarged plan view showing a part of the head section of the composite magnetic head shown in FIG. 2A.

FIG. 3 is an enlarged plan view showing a part of a sliding surface 21a of the head chip 38 shown in FIGS. 2A and 2B.

A manufacturing process of the erasing gap 31 has the steps of: forming nonmagnetic material films such as $SiO_2$ on the joint surfaces of the center core 26 and the erasing core 24 by vapor deposition, sputtering or other method; joining the nonmagnetic films to each other by an adhesive; and filling glass in the grooves to form glass-molded parts for limiting the erasing head track width $W_g$.

A manufacturing process of the recording/reproducing head gap 33 has the steps of: forming Sendust (Fe—Al—Si alloy) films 32 on the joint surfaces of the recording/reproducing core 25 and the center core 26 by vapor deposition, sputtering or other method; forming nonmagnetic material films such as $SiO_2$ on the Sendust films 32 of the center core 26 and the recording/reproducing core 24 by vapor deposition, sputtering or other method; joining the nonmagnetic films to each other by an adhesive; and filling glass in the grooves to form glass-molded parts for limiting the recording/reproducing head track width $W_w$.

The erasing track width $W_g$ is greater than the recording/reproducing track width $W_w$.

Figure 4:
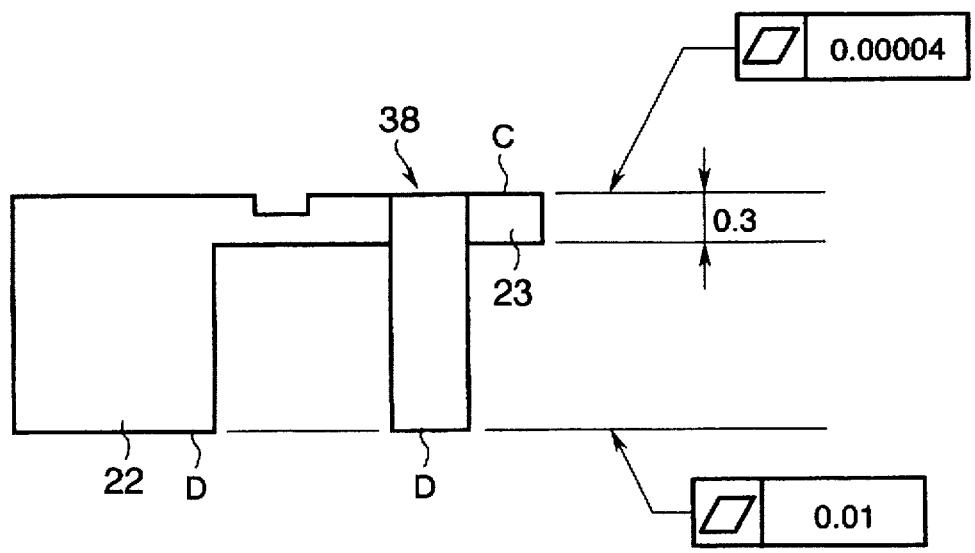
FIG. 4 is an enlarged side view showing a part of the composite magnetic head of FIG. 2B.

FIG. 4 is an explanatory diagram explaining flatness of the sliding surface C of the head holders 22 and 23, the erasing gap 31 and the recording/reproducing gap 33, and flatness of the bottom surface D of the holder 22 and the head chip 38. The flatness is measured by determining the distances of the target face from two virtual parallel planes. The sliding surface C has a flatness 40 [nm] or less, and the bottom surface D has a flatness 10 [μm] or less.

Figure 5:
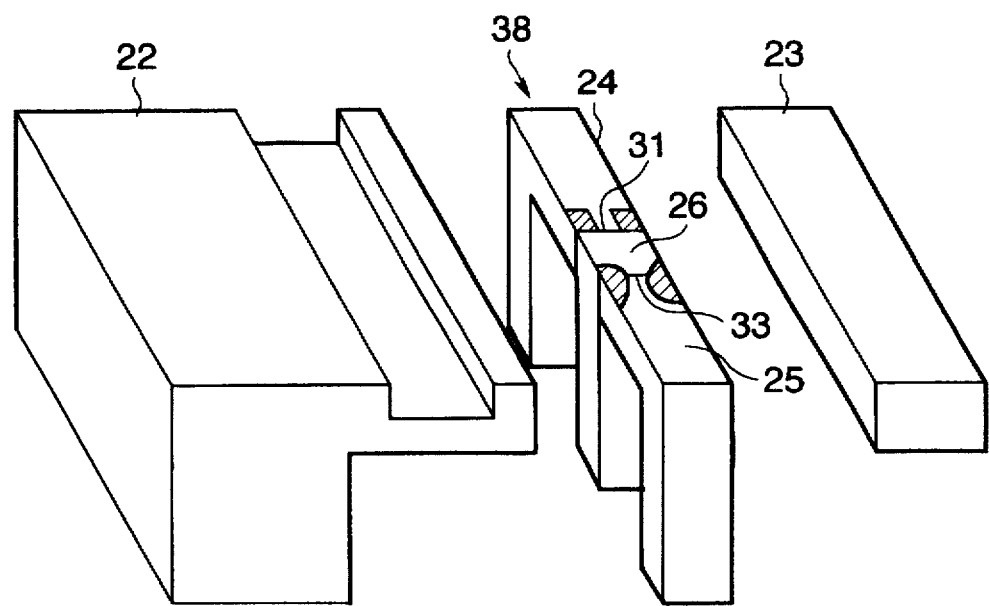
FIG. 5 and FIG. 6 are exploded perspective views illustrating the method of producing the composite magnetic head shown in FIG. 1.
Figure 6:
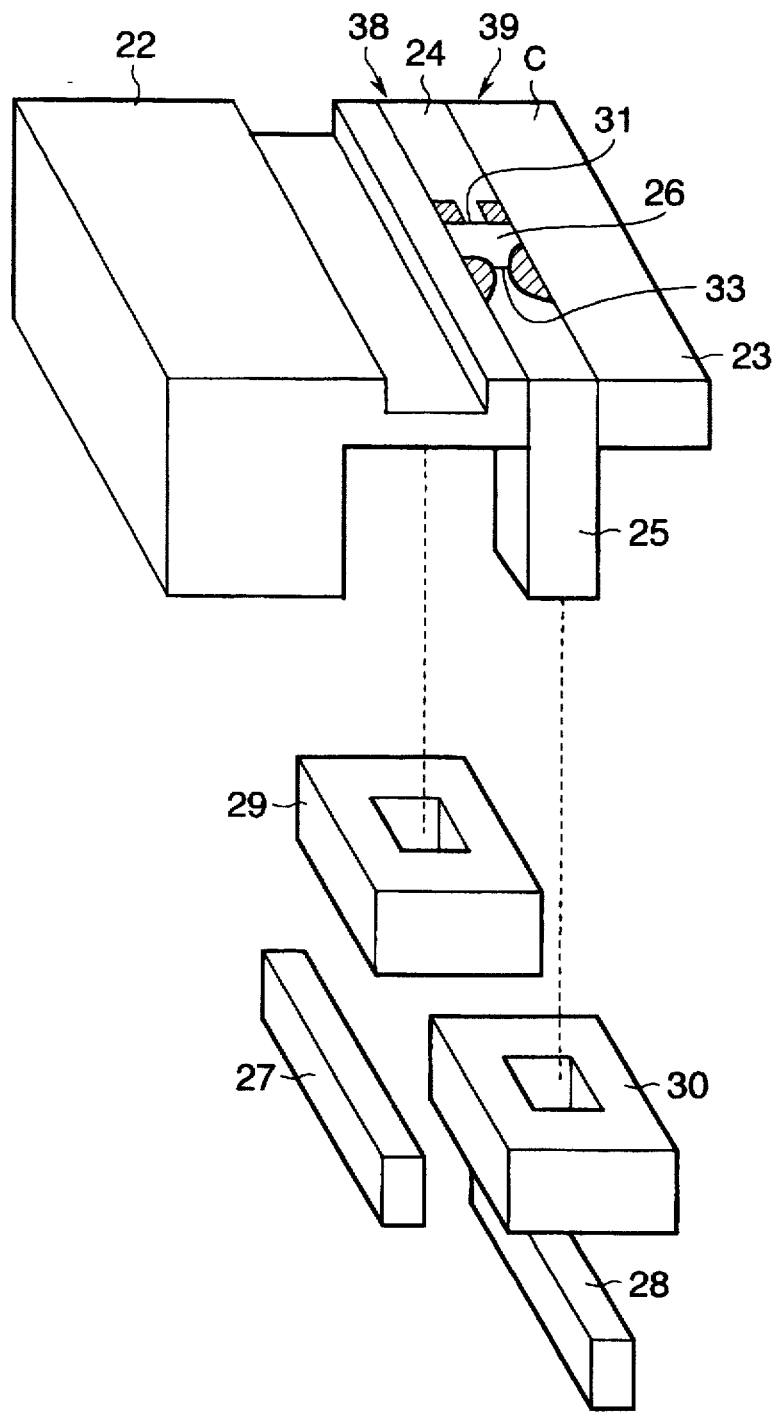

The composite magnetic head 20 of FIG. 1 is assembled as shown in FIG. 5 and FIG. 6. First, the erasing core 24, the recording/reproducing core 25 and the center core 26 are joined and the grooves for limiting the track width 34 and 35 are filled with glass, as shown in FIG. 5. This forms the head chip 38 having the erasing gap 31 and the recording/reproducing gap 33. The gap-to-gap distance $L_g$ must be shorter than the length $L_h$ of the $GAP_1$ or $GAP_2$ area in the sector 19 on the FD, which is shown in FIG. 30.

Next, the holders 22 and 23 are stuck to opposite sides of the head chip 38 by an adhesive so as to form the head slider 39 having a sandwich structure, as shown in FIG. 6. The sliding surface C of the head slider 39 is finished using a lapping device. Then, the erasing core 24 and the recording/reproducing core 25 are inserted into the erasing coil 29 and the recording/reproducing coil 30 respectively, as shown in FIG. 6. The erasing back bar 27 is mounted to form a magnetic circuit connecting the erasing core 24 and the center core 26. The recording/reproducing back bar 28 is mounted to form another magnetic circuit connecting the recording/reproducing core 25 and the center core 26.

Figure 7:
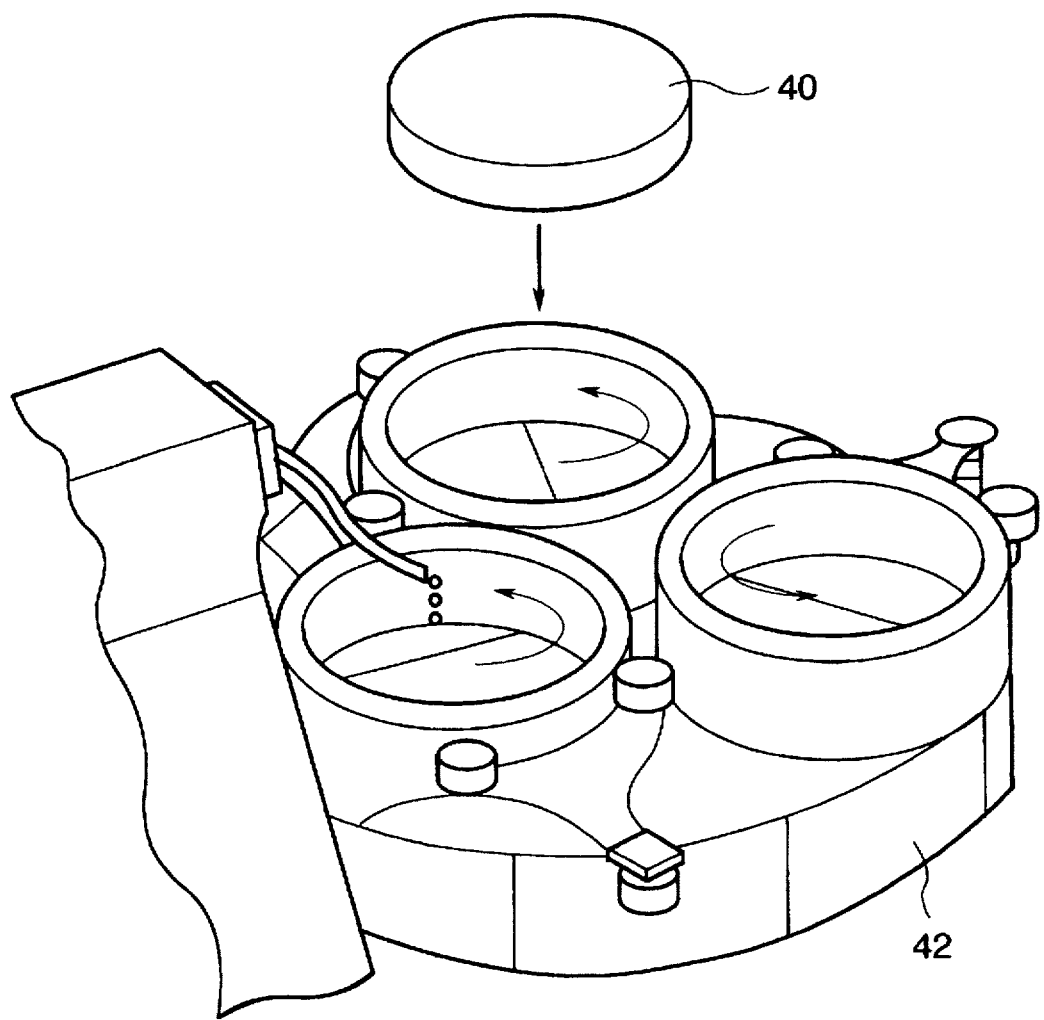
FIG. 7 is a perspective view showing a lapping device used in producing the composite magnetic head of FIG. 1.
Figure 8:
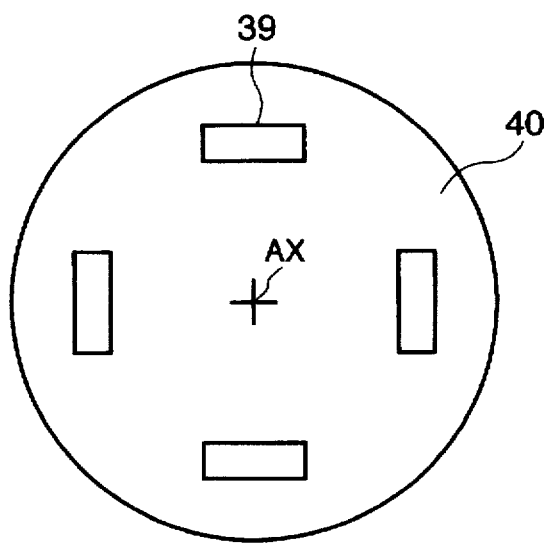
FIG. 8 shows a specimen holder of the lapping device used in producing the composite magnetic head of FIG. 1.
Figure 9:
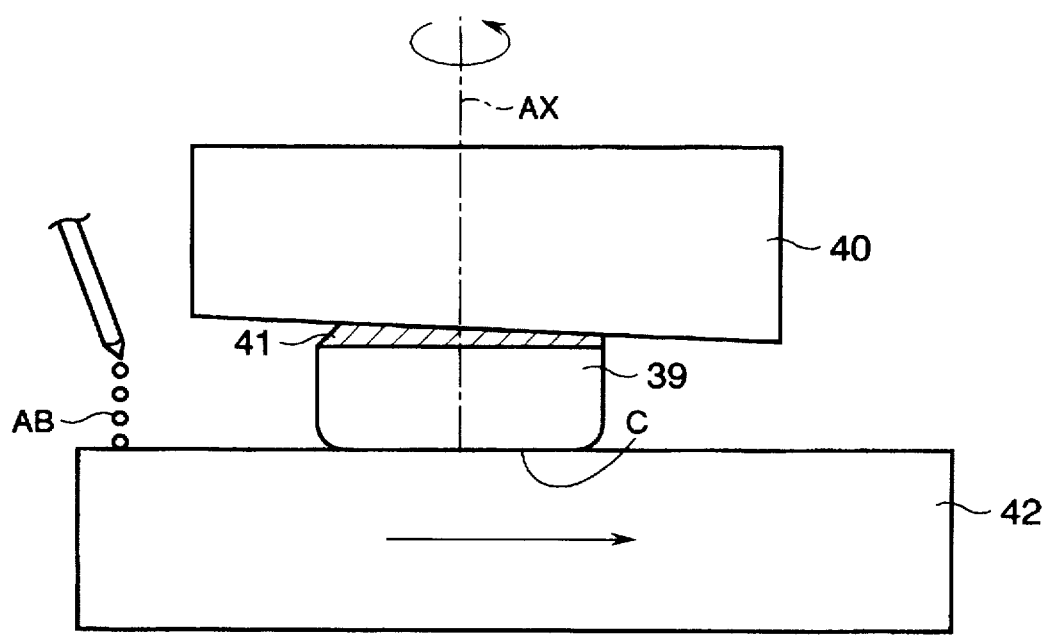
FIG. 9 is a side view illustrating a lapping process performed by the lapping device when producing the composite magnetic head of FIG. 1.

The sliding surface C of the head slider 39 is finished using a lapping device, as shown in FIG. 7. The head slider 39 is stuck on a specimen holder 40 made of cast iron by wax 41, as shown in FIG. 7 to FIG. 9. An abrasive made of a graphite carbon (GC) compound, diamond compound or other compound put into a solvent is applied on the surface of a lapping plate 42 beforehand. The specimen holder 40 is placed on the lapping plate 42 of the lapping device shown in FIG. 7. The lapping plate 42 is rotated to grind the sliding surface C of the head slider 39. While the lapping plate 42 is rotating, the abrasive AB is drip-fed as required, as shown in FIG. 9. When the lapping plate 42 rotates, the specimen holder 40 on which the head slider 39 is stuck turns on its axis AX, as shown in FIG. 7. The sliding surface C of the head slider 39 is ground by the compound contained in the abrasive AB provided between the sliding surface C and the lapping plate 42.

Figure 10A:
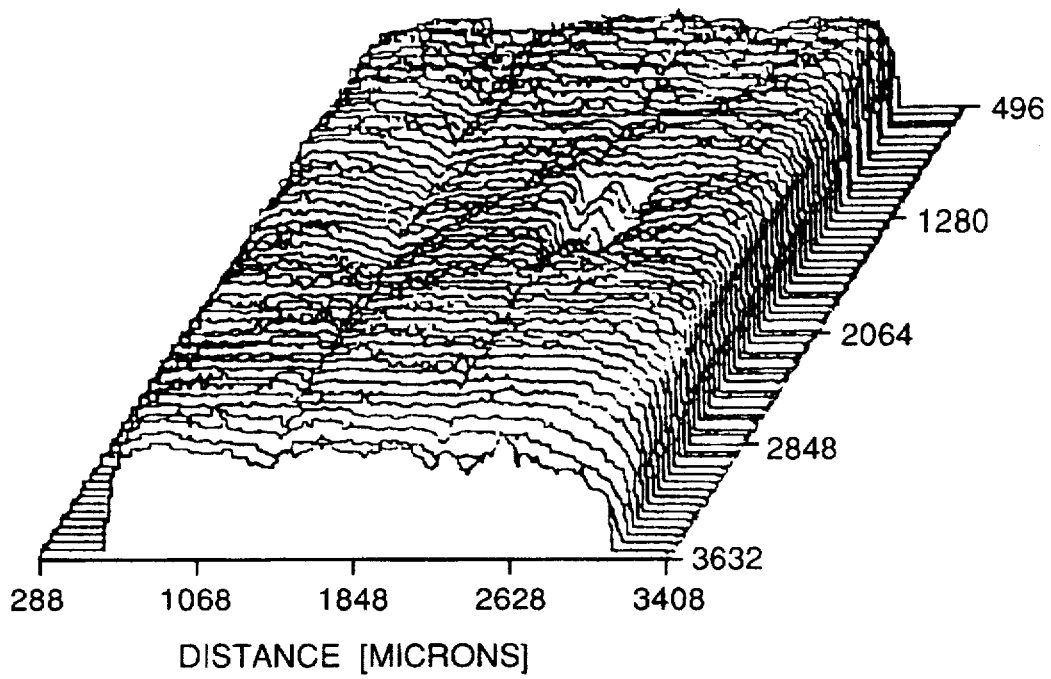
FIGS. 10A and 10B are measurement results that indicate how the sliding surface of the composite magnetic head changes before and after the removal of the composite magnetic head.
Figure 10B:
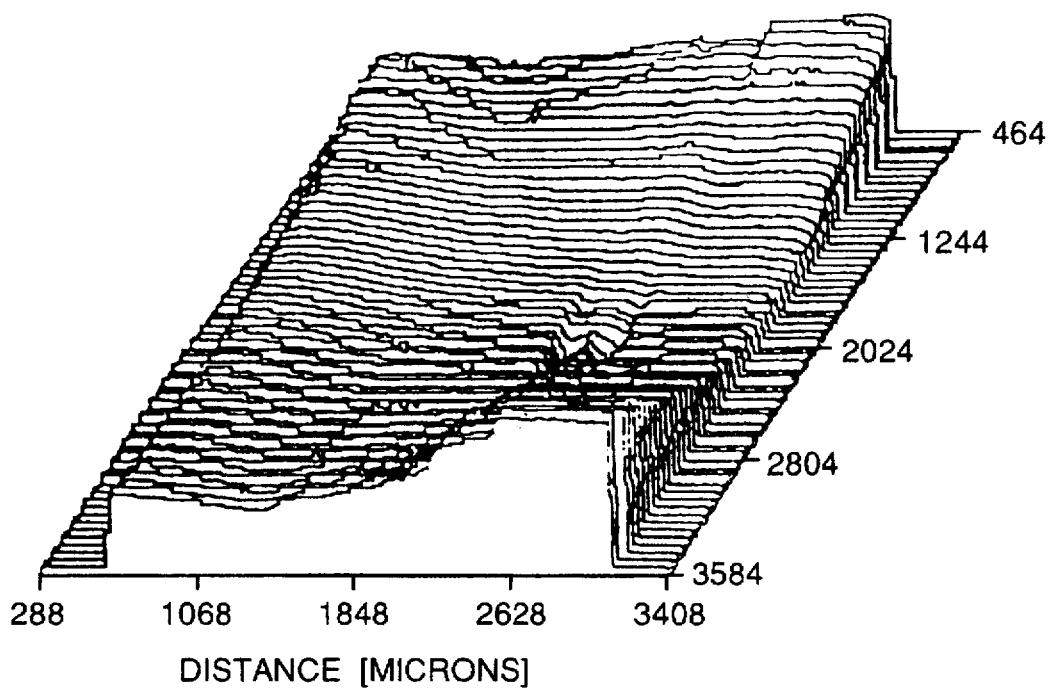

After being ground as described above, the sliding surface C of the head slider 39 becomes very flat. However, the high flatness of the sliding surface C may be degraded after the head slider 39 is removed from the specimen holder 40. FIGS. 10A and 10B show the surface contours obtained by a non-contacting contour measuring device, which indicate a change in flatness. FIG. 10A shows the contour of the sliding surface C of the finished head slider 39 staying on the specimen holder 40 and FIG. 10B shows the contour of the sliding surface C of the finished head slider 39 removed from the specimen holder 40. The figures indicate that the contour of the sliding surface C of the head slider 39 staying on the specimen holder 40, as shown in FIG. 10A, widely changes when it is removed from the specimen holder 40, shown in FIG. 10B, and that the flatness is degraded. The cause of the degradation in flatness lies in the shrink of the wax 41 used to stick the head slider 39 onto the specimen holder 40. It is supposed that the finished head slider 39 is freed from the stress produced by the wax 41 and deformed when it is removed from the specimen holder 40.

If the deformed head slider 39 is used, the degraded flatness of the sliding surface C causes a clearance to be created between the FD and the surface of the composite magnetic head 20 facing the FD. This results in low head output, which poses a serious problem especially for a composite magnetic head for use with 1.8-inch FDs.

The deformation of the sliding surface C of the head slider 39 can be prevented by reducing the amount of the wax 41 applied to stick the bottom surface D (see FIG. 4) of the head slider 39 onto the specimen holder 40 and by making the bottom surface D as flat as the sliding surface C.

Figure 11:
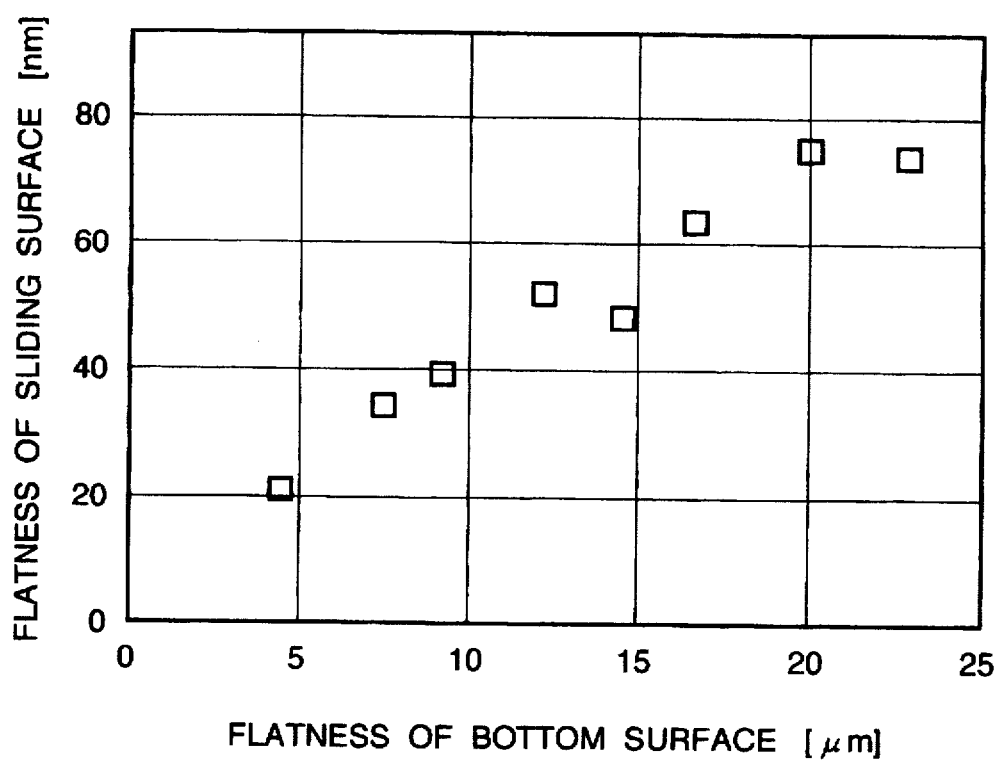
FIG. 11 shows the relationship between the sliding surface (top surface) and bottom surfaces of the head section in flatness.

FIG. 11 shows the relationship in flatness between the bottom surface D and the sliding surface C of the head slider 39. The maximum permissible output attenuation caused by the clearance between the sliding surface C of the head slider 39 and the FD is 10[%]. To satisfy this requirement of 10[%], the flatness of the sliding surface C must be 40 [nm] or less. Accordingly, the flatness of the bottom surface D must be 10 [μm] or less, as indicated in FIG. 11.

Figure 12:
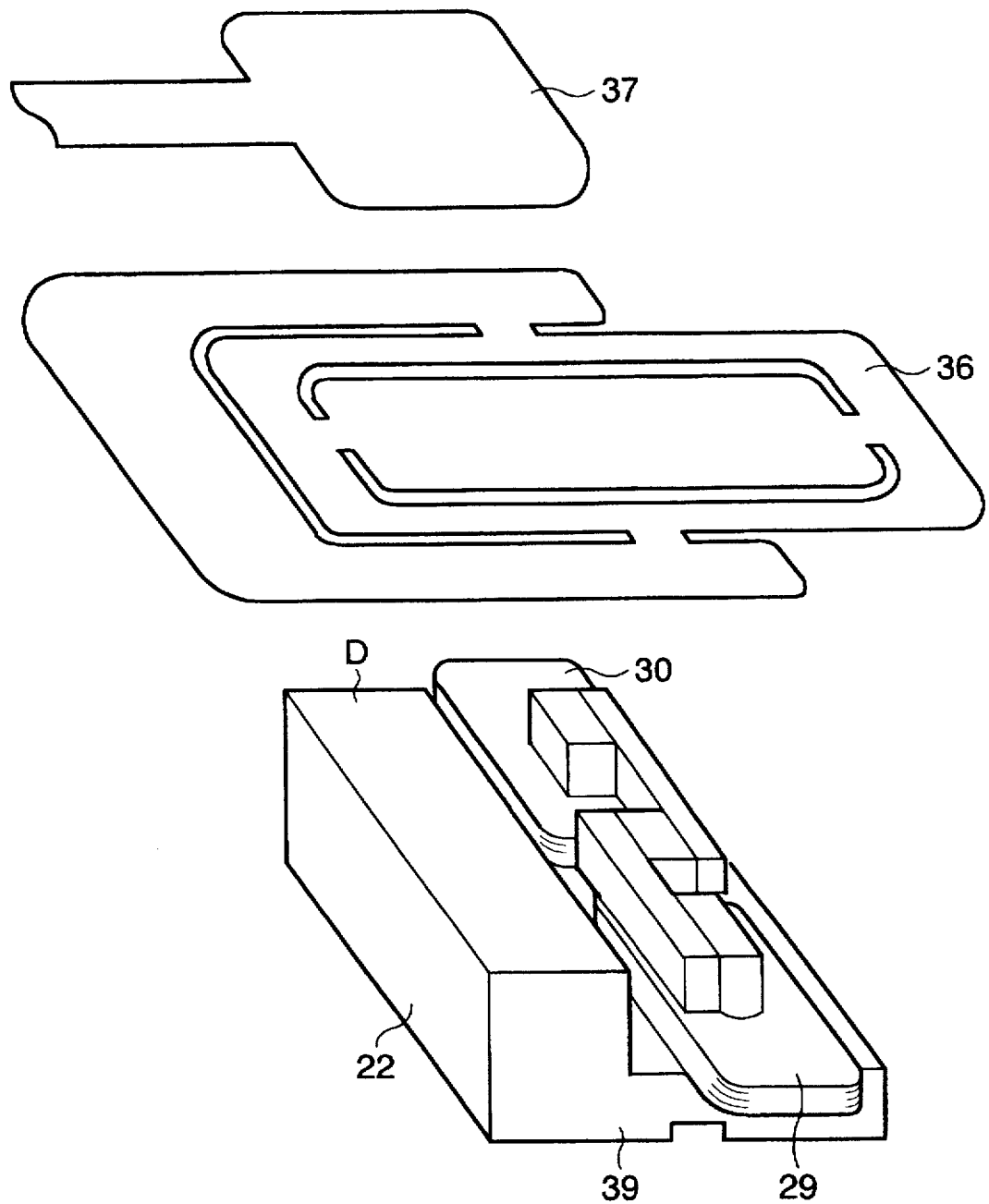
FIG. 12 is an exploded perspective view illustrating the method of producing the composite magnetic head shown in FIG. 1.

As shown in FIG. 5, the erasing core 24 and the recording/reproducing core 25 are inserted into the erasing coil 29 and the recording/reproducing coil 30 respectively, and two magnetic circuits are formed by mounting the erasing back bar 27 to connect the erasing core 24 and the center core 26 and by mounting the recording/reproducing back bar 28 to connect the recording/reproducing core 25 and the center core 26. Then, the bottom surface D of the holder 22 of the head slider 39 is stuck to gimbals 36 by an adhesive, as shown in FIG. 12. The FPC 37 is stuck on the other side of the gimbals 36. The expansion leads of the erasing coil 29 and the recording/reproducing coil 30 are soldered on the FPC 37.

Figure 31A:
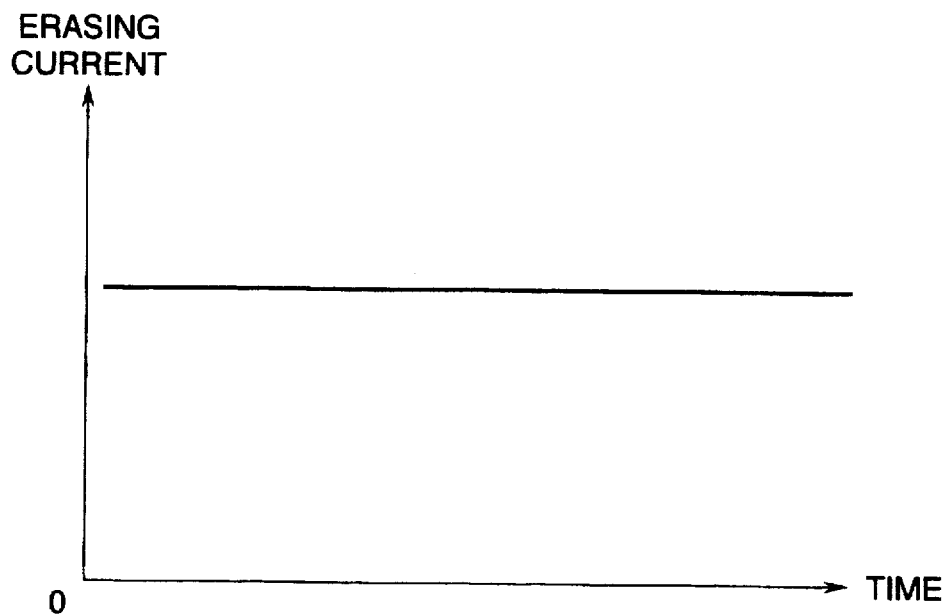
FIGS. 31A and 31B show an erasing current and a recording current.
Figure 31B:
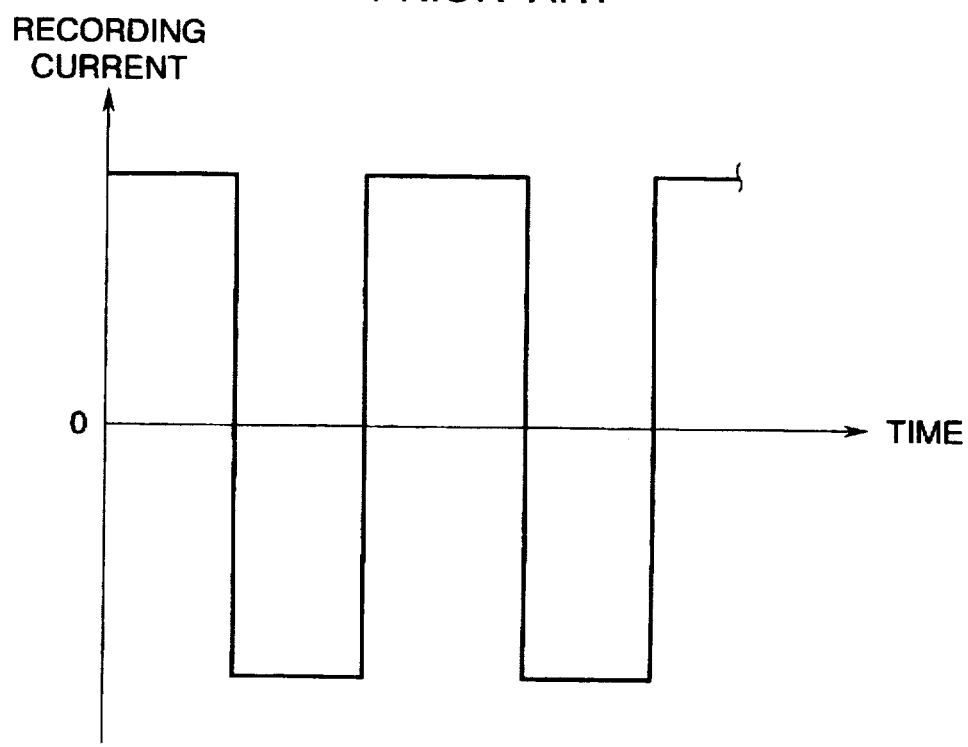

Two composite magnetic heads 20 assembled as described above and facing each other are brought into close contact with both surfaces of an FD. When data is recorded on the FD, the FD is rotated, and the composite magnetic head 20 accesses a certain track. Then, the direct current indicated in FIG. 31A is passed through the erasing coil 29, and the current carrying the information to be recorded, which has a rectangular waveform as shown in FIG. 31B, is passed through the recording/reproducing coil 30. The old data recorded on the FD is erased when the magnetic layer on the FD enters the direct-current magnetic field spreading out from the erasing gap 31. When the magnetic layer of the FD enters the magnetic field varying with the current flowing through the recording/reproducing coil 30 and spreading out from the recording/reproducing gap 33, which traces the FD after the erasing gap 31, a pattern of magnetization is formed and new data is recorded on the magnetic layer of the FD. Since the gap-to-gap distance $L_g$ is shorter than the length $L_h$ of the $GAP_1$ or $GAP_2$ area in a sector on the FD, the data is stored in the DATA area of the sector and the data in the ID area is not overwritten.

Figure 13A:
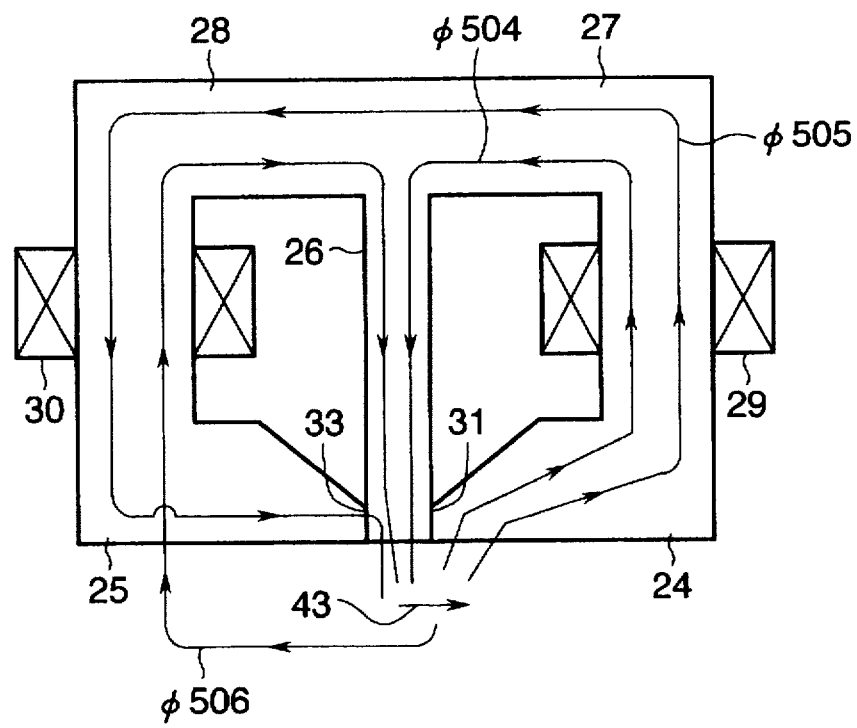
FIGS. 13A and 13B are explanatory diagrams showing the operation of the composite magnetic head shown in FIG. 1.
Figure 13B:
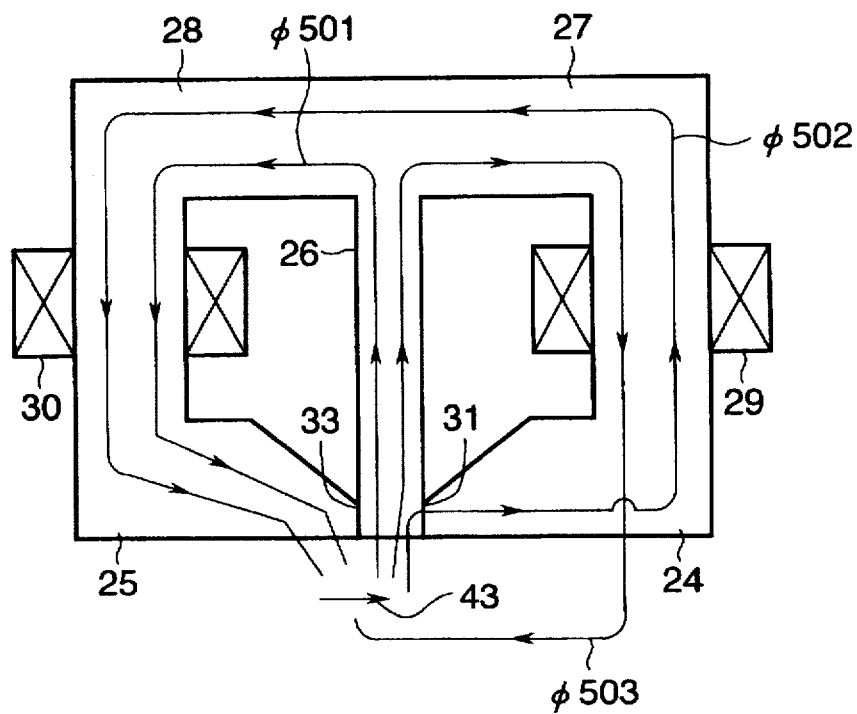

FIGS. 13A and 13B illustrates the reproducing operation, wherein a reference numeral 43 denotes micromagnetization on the magnetic layer of the FD, and $\phi_{501}$ to $\phi_{506}$ denote magnetic fluxes. In FIG. 13A, the micromagnetization 43 is on the erasing gap 31. In FIG. 13B, the micromagnetization 43 is on the recording/reproducing gap 33. In FIG. 13B, the magnetic flux starting from the micromagnetization 43 is divided into $\phi_{501}$, $\phi_{502}$ and $\phi_{503}$. The magnetic fluxes $\phi_{501}$ and $\phi_{502}$ cross the recording/reproducing coil 30 together, generating a voltage proportional to the change in the micromagnetization 43 at both ends of the recording/reproducing coil 30. In FIG. 13A, the magnetic flux is divided into $\phi_{504}$, $\phi_{505}$ and $\phi_{506}$. The magnetic flux $\phi_{505}$ passes through the erasing core 24, the erasing back bar 27, the recording/reproducing back bar 28, the recording/reproducing core 25, and the recording/reproducing gap 33. The magnetic flux $\phi_{506}$ passes through the space containing the FD, the recording/reproducing core 25, the recording/reproducing back bar 28 and the center core 26. The magnetic fluxes $\phi_{505}$ and $\phi_{506}$ cross the recording/reproducing coil 30. The magnetic flux $\phi_{rv}$ crossing the recording/reproducing coil 30 can be obtained by the following expression (3):

$$\phi_{rv}=\phi_{506}-\phi_{505} \qquad \text{(expression 3)}$$

A signal caused by the micromagnetization 43 is generated in the recording/reproducing coil 30. The signal is called a reproduction crosstalk and has the waveform shown in FIGS. 14A to 14C.

Figure 14A:
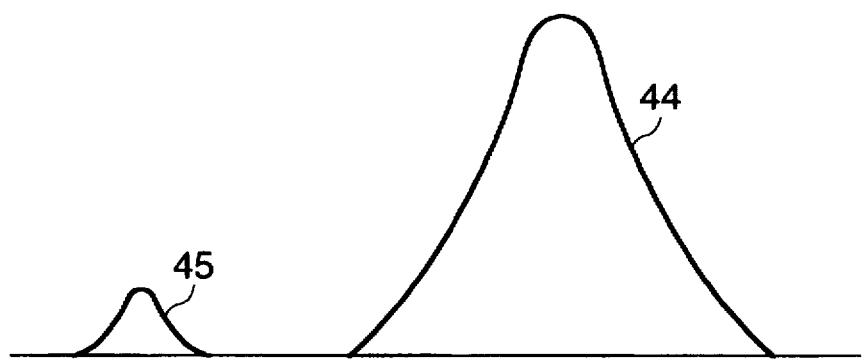
FIGS. 14A to 14C show waveforms of reproduction crosstalk.
Figure 14B:
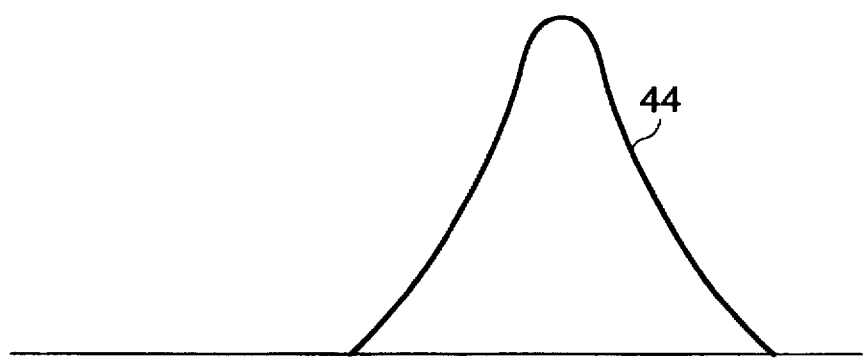
Figure 14C:
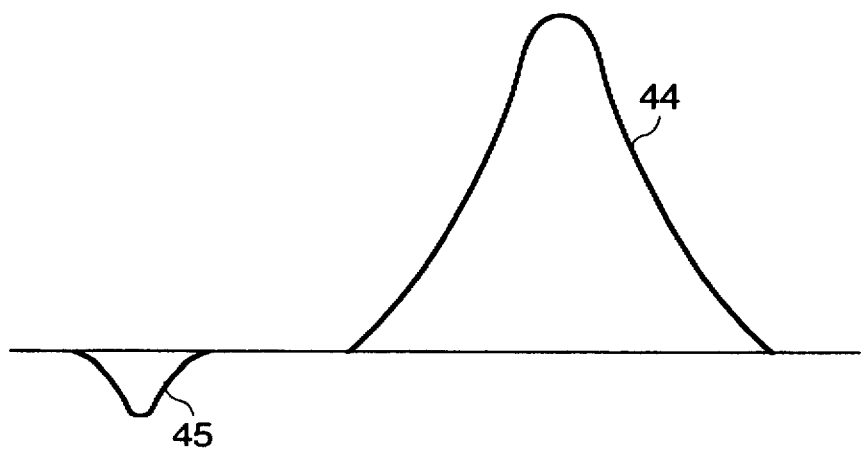

In FIGS. 14A to 14C, a reference numeral 44 denotes a single generated when the micromagnetization 43 is placed on the recording/reproducing gap 33, and 45 denotes a signal generated when the micromagnetization 43 is placed on the erasing gap 31. The signal 45 inverts its polarity, as shown in FIGS. 14A and 14C, depending on the balance between $\phi_{506}$ and $\phi_{505}$, which are indicated in FIGS. 13A and 13B. The height of the signal 45 is minimized as shown in FIG. 14B when $\phi_{506}$ and $\phi_{505}$ are in a good balance. The signal 45 changes its level, depending on the magnetic reluctance the magnetic fluxes $\phi_{505}$ and $\phi_{506}$ experience. The magnetic reluctance is determined by the permeability of ferrite used as the material of the cores 24, 25 and 26 and the back bars 27 and 28 or the length of the cores 24, 25 and 26 (length of magnetic circuit).

Figure 15:
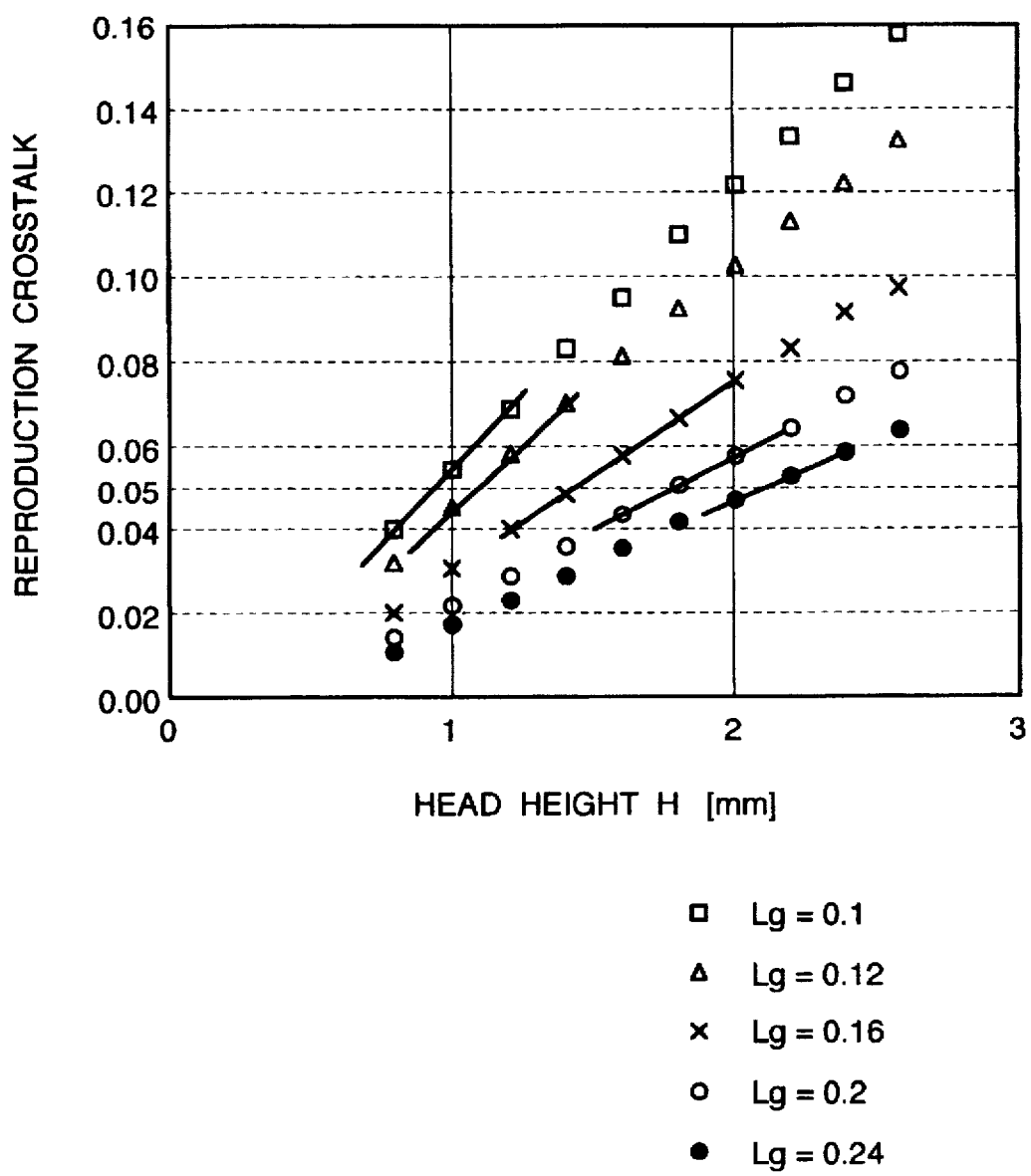
FIG. 15 is a graph showing the relationship between the head height and the reproduction crosstalk according to the present invention.
Figure 16:
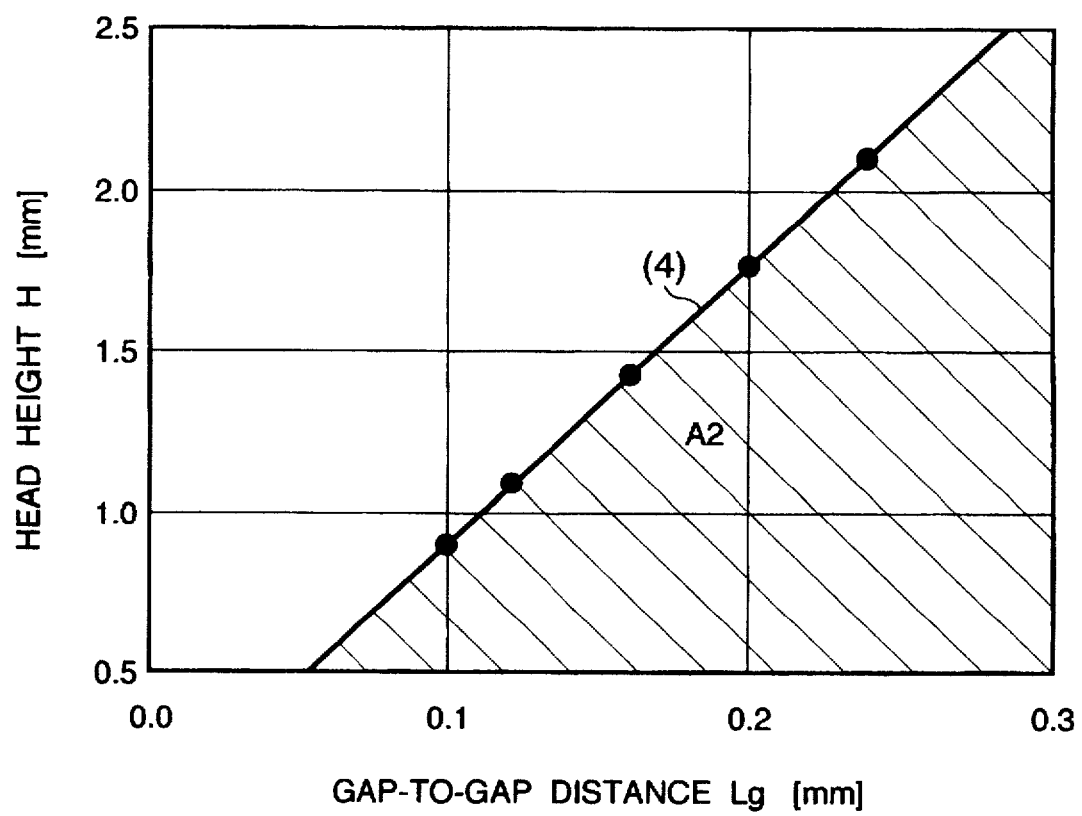
FIG. 16 shows an area in which the reproduction crosstalk of the composite magnetic head according to the present invention does not exceed 5[%]

FIG. 15 shows the level of reproduction crosstalk varying with the length of magnetic circuit or the head height H, taking the gap-to-gap distance $L_g$ as a parameter. FIG. 16 shows the relationship between the gap-to-gap distance $L_g$ and the head height H with which a reproduction crosstalk value of 0.05(5[%]) indicated in FIG. 15 is not exceeded. The curve in the FIG. is approximated by a line represented by the expression (4).

$$H=0.058+8.6\times L_g \qquad \text{(expression 4)}$$

The area $A_2$ below the line represented by the following expression (1) consists of all combinations of gap-to-gap distance $L_g$ and the head height H resulting in a crosstalk of up to 5[%].

$$H\leq 0.058+8.6\times L_g \qquad \text{(expression 1)}$$

Figure 17:
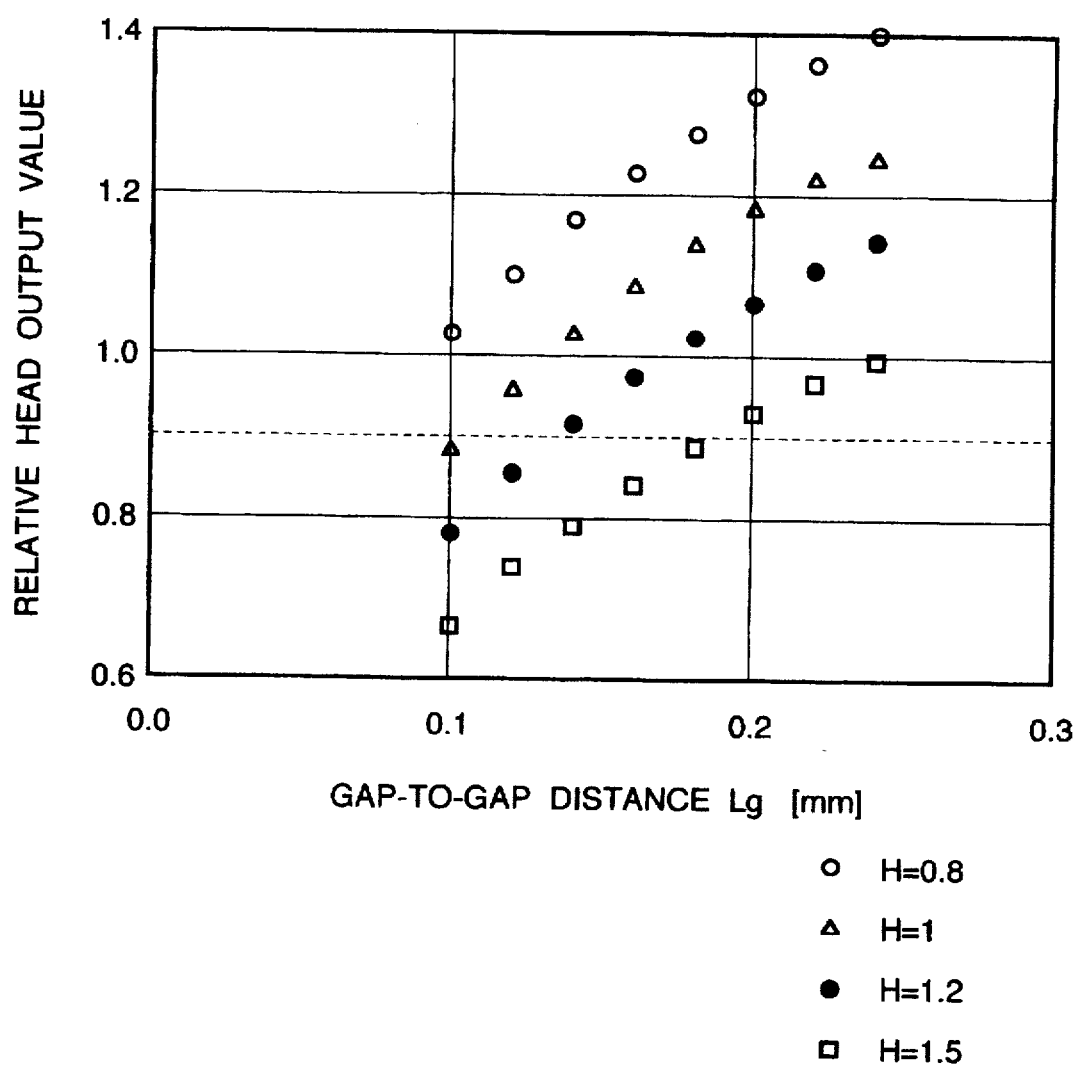
FIG. 17 is a graph showing the relative head output of the composite magnetic head according to the present invention.
Figure 18:
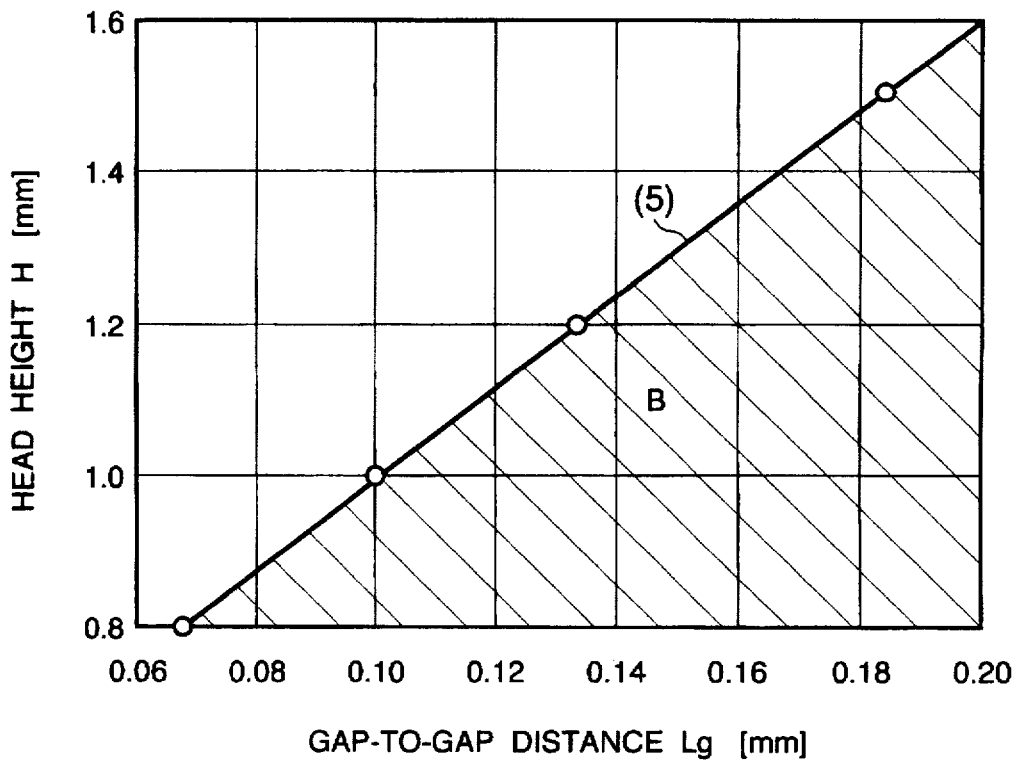
FIG. 18 shows an area in which the composite magnetic head according to the present invention maintains a head output of 90 [%] at least.

FIG. 17 shows the relationship between the gap-to-gap distance $L_g$ and the relative head output value, taking the head height H as a parameter. FIG. 18 shows the relationship between the gap-to-gap distance $L_g$ and the head height H with which a head output of 0.9(90[%]) indicated in FIG. 17 is maintained. The curve in FIG. 18 is approximated by a line represented by the expression (5) given below.

$$H=0.41+5.9\times L_g \qquad \text{(expression 5)}$$

The area $B_1$ below the line represented by the expression (2) consists of all combinations of the gap-to-gap distance $L_g$ and head height H resulting in a head output of 90[%] or greater.

$$H\leq 0.41=5.9\times L_g \qquad \text{(expression 2)}$$

Figure 19:
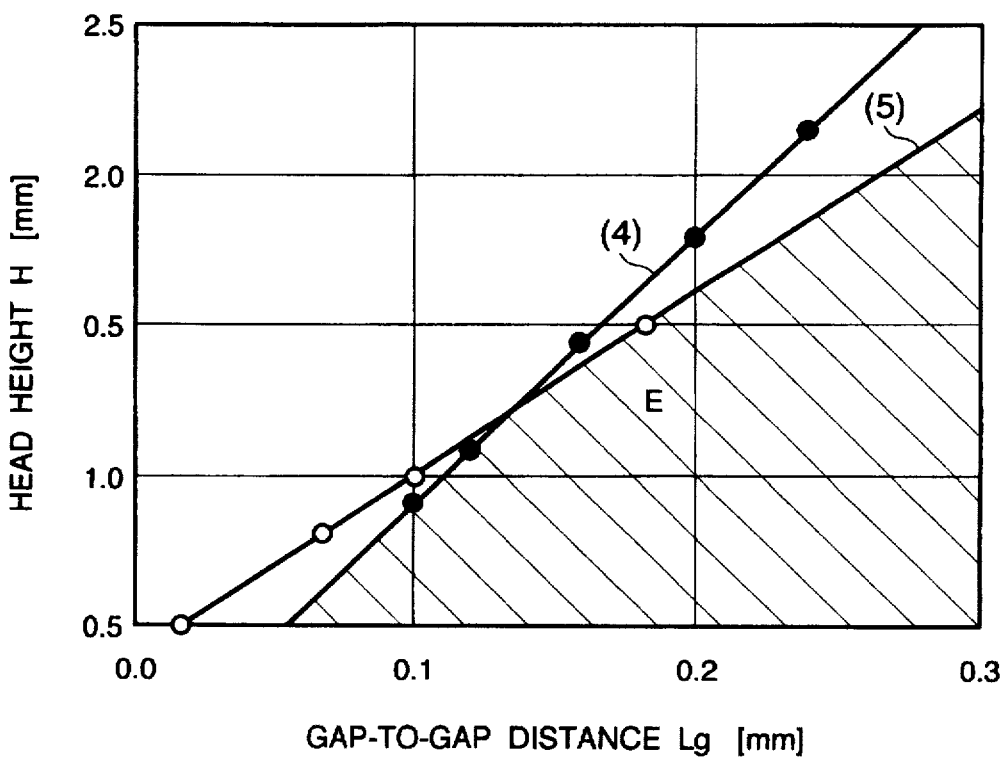
FIG. 19 shows an area in which the composite magnetic head according to the present invention ensures a reproduction crosstalk of 5[%] or below and a head output of 90[%] or above.

FIG. 19 shows both the line represented by the expression (1) indicated in FIG. 16 and the line represented by the expression (2) indicated in FIG. 18. FIG. 19 indicates that a composite magnetic head can ensure a crosstalk of 5[%] or less and a head output of 90[%] or greater if its gap-to-gap distance $L_g$ and head height H agrees with any combination within the area E below both the line represented by the expression (1) and the line represented by the expression (2).

In the first embodiment, a crosstalk of 5[%] or less and a head output of 90[%] or greater can be ensured by choosing any combination of the gap-to-gap distance $L_g$ and head height H satisfying the conditions represented by the expressions (1) and (2) given above. The composite magnetic head 20 of the first embodiment can provide high output and high-quality low-noise signals in reproducing and recording a 1.8-inch FD having the same storage capacity as the currently typical 3.5-inch FD (2 [MB] /1.44 [MB]).

Figure 20:
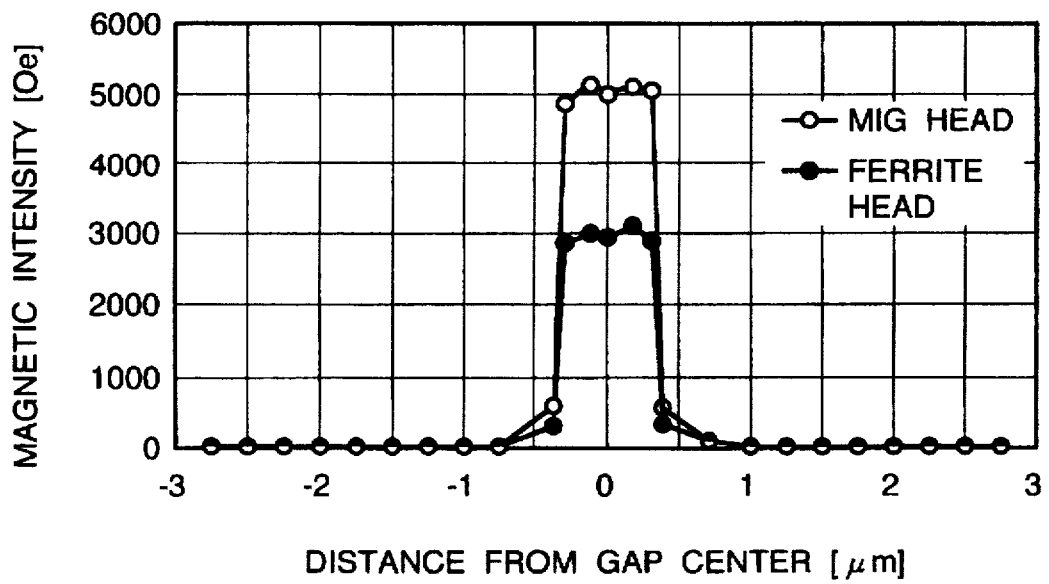
FIG. 20 shows magnetic intensity of a MIG head and a ferrite head.

Since the head utilizes the MIG structure using the Sendust films as shown in FIG. 3, the strength of the magnetic field spreading outside the recording/reproducing gap 33 and reaching the magnetic layer of the FD is 1.7 times of the magnetic field strength of a ferrite head, as shown in FIG. 20. The MIG head can properly write a metal-coated medium having a magnetic intensity ($H_c$) of 1500 [Oe (oersteds)] and a magnetic induction (Br) of 2500 [gausses] for instance. The head end output is also large enough. The composite magnetic he The be used for 1.8-inch FDs.

The 1.8-inch FD can attain the storage capacity of the currently typical 3.5-inch FD, that is, 2 [MB] when unformatted and 1.44 [MB] when formatted, if it, for instance, satisfies the following conditions:

Size of the ID area=22 [bytes]

Size of the $GAP_1$ area=41 [bytes]

Size of the DATA area=530 [bytes]

Size of the $GAP_2$ area=83 [bytes]

Track density=254 [TPI]

Record line density=2652 [bytes/rad]

Number of cylinders=60

Minimum track radius=13.5 [mm]

In this case, the GAP length $L_h$ is 0.2 [mm], which is the length of $GAP_1$. Actually, $L_h$ of 0.18 [mm] or less is desired to allow for variations in the speed of the motor rotating the FD.

As described above, the gap-to-gap distance $L_g$ must be shorter than the GAP length $L_h$. So, the gap-to-gap distance $L_g$ must be shorter than 0.2 [mm] ($L_g<0.2$ [mm]). To ensure a reproduction crosstalk of 5 [%] or less and a head output of 90[%] or higher, the head height H must not exceed 1.6 [mm] (H<1.6 [mm]) while the gap-to-gap distance $L_g$ is shorter than 0.2 [mm] ($L_g<0.2$ [mm]), as clearly indicated in FIG. 19.

A composite magnetic head with a gap-to-gap distance $L_g$ shorter than 0.2 [mm] ($L_g<0.2$ [mm]) and a head height H smaller than 1.6 [mm] (H <1.6 [mm]) can ensure a crosstalk of 5[%] or less and a head output of 90[%] or greater and can provide high output and high-quality low-noise signals in reproducing or recording a 1.8-inch FD having the same storage capacity as the currently typical 3.5-inch FD (2 [MB]/1.44 [MB]).

Second Embodiment

Figure 21:
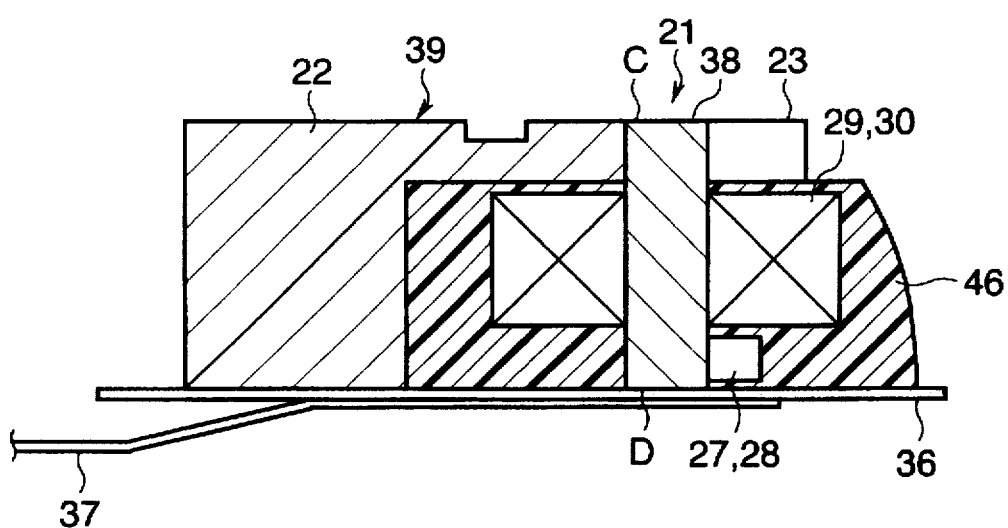
FIG. 21 is a cross sectional view of another composite magnetic head according to a second embodiment of the present invention.

FIG. 21 is a cross sectional view of a composite magnetic head according to a second embodiment of the present invention. In FIG. 21, a reference numeral 21 denotes a head section, and reference numerals 22 and 23 denote holders made of ceramics. A reference numeral 27 denotes an erasing back bar when viewing the cross section across the erasing back bar, and a reference numeral 28 denotes a recording/reproducing back bar when viewing the cross section across the recording/reproducing back bar. A reference numeral 29 denotes an erasing coil when viewing the cross section across the erasing back bar 27, and a reference numeral 30 denotes a recording/reproducing coil when viewing the cross section across the recording/reproducing back bar 28. A reference numeral 36 denotes gimbals, 37 denotes an FPC, and 46 denotes a molding resin for filling a space surrounded by the head section 21, the holders 22 and 23, and the gimbal 36, and covering the erasing coil 29, the recording/reproducing coil 30, the erasing back bar 27 and the recording/reproducing back bar 28. On the surfaces of the holders 22 and 23, the back bars 27 and 28, and the coils 29 and 30, a fluorine parting compound is sprayed or applied to a thickness of about 1 [μm]. A reference numeral 39 denotes a head slider including the head chip 38 and the holders 22 and 23, and C denotes the sliding surface of the head slider 39.

The method of producing the composite magnetic head of FIG. 21 will next be described.

The head chip 38, the holders 22 and 23, the erasing coil 29, the recording/reproducing coil 30, the erasing back bar 27 and the recording/reproducing back bar 28 are assembled in the same way as in the first embodiment. A fluorine parting compound is applied on the surfaces of the holders 22 and 23, the back bars 27 and 28, and the coils 29 and 30 to a thickness of about 1 [μm]. The molding resin 46 is poured. After the molding resin 46 is hardened, the bottom surface D of the holders 22 and 23 including the bottom of the molding resin 46 is ground to a flatness of 10 [μm] or less, as in the first embodiment. The sliding surface C of the head slider 39 is ground to a flatness of 40 [nm] or less. Then, the gimbal 36 and the FPC 37 are mounted, and the expansion leads of the coils 29 and 30 are soldered on the FPC 37.

The molding resin 46 is an epoxy resin compound, which contains at least one epoxy resin which is selected from the group consisting of materials represented by the following chemical structural formulae (1) to (4):

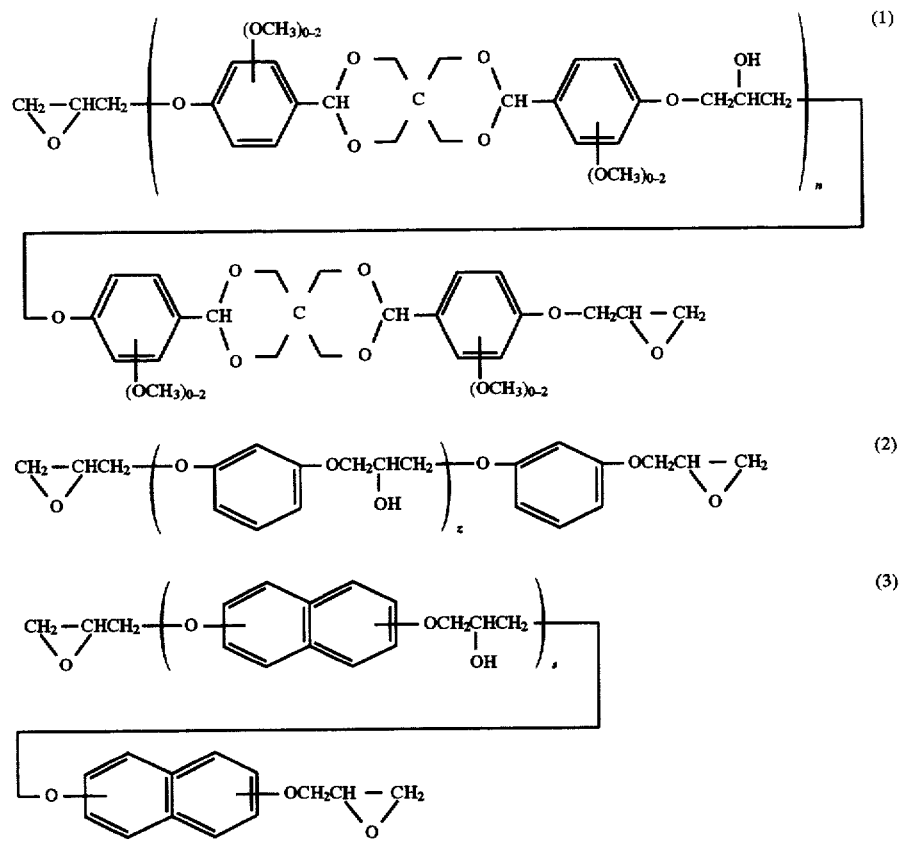

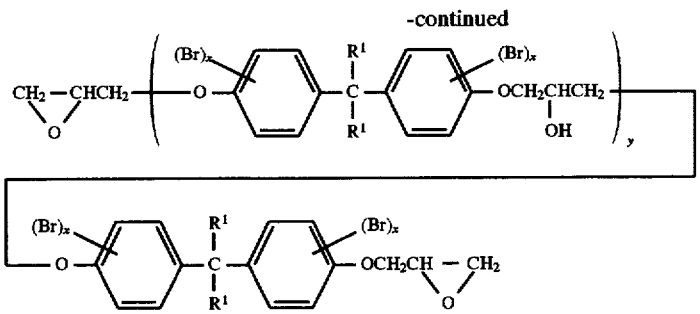

where n, z, and s in the formulae (1) to (3) represent 0 or an integer from 1 to 4 on average, each $R^1$ represents a hydrogen atom or a methyl group, each x represents an integer from 1 to 4, and y represents 0 or an integer from 1 to 4 on average.

The epoxy resin compound also contains an acid anhydride such as methyltetrahydrophtalic acid or methylnadic acid, and an epoxysilane coupling agent such as the erasing coil 16 the erasing coil 16γ-glycidoxypropyltrimetoxysilane. The epoxysilane coupling agent may be replaced with phenyl aminosilane coupling agent, mercaptosilane coupling agent, titanate coupling agent or the like.

The epoxy resin compound also contains a silica filler or an alumina filler. The filler is composed of particles, an average diameter of which is not more than 60 [μm] and which include particles with a diameter of not more than 5 [μm] at a rate of at least 5[%] by weight;

The epoxy resin compound also contains a hardener such as 2-ethyl-4-methyl-imidazole for hardening the compound.

A ratio of number of acid anhydride groups in the acid anhydride to number of epoxide groups in the epoxy resin is from 0.5 to 1.5. A ratio of weight of the hardener to weight of the epoxy resin is from 0.05 to 10, to 100, a ratio of weight of the coupling agent to weight of the filler is from 0.05 to 5, to 100, and a percentage of weight of the filler to weight of the molding resin is from 35[%] to 95[%].

The parting compound is, for example, the fluorine parting compound produced by Daikin Industries K.K. (known under the designation "Daifree") or a silicone parting compound produced by Highsol Co., Ltd. (known under the designation "Highrelease").

In the configuration described above, the molding resin 46 functions as hard packing, increasing the rigidity of the head slider 39 and significantly mitigating the deformation of the ground sliding surface C of the head slider 39.

The molding resin 46 has a linear expansion coefficient of $110 \times 10^{-7}/°$ C. while the material of the head chip 38 has a linear expansion coefficient of $106 \times 10^{-7}/°$ C. Due to the matching thermal expansion coefficients of the molding resin 46 and the head chip 38 and due to the parting compound applied on the surface, the molding resin 46 imposes almost no stress on the head chip 38. We have found by experiment that the stress causes the permeability of the head chip 38 to be degraded just by a couple of per cent at most and that the head output is hardly degraded. The linear expansion coefficient of the molding resin 46 is close to the linear expansion coefficient of the holders 22 and 23, which is $115 \times 10^{-7}/°$ C. Since the linear expansion coefficients match, the molding resin 46 does not cause the head slider 39 to be deformed and especially does not cause the flatness of the sliding surface C of the head slider 39 to be degraded.

Third Embodiment

The composite magnetic heads described above with reference to FIG. 1 and FIG. 21 use the expanded windings of the erasing coil 29 and the recording/reproducing coil 30 as the leads that electrically connect the erasing coil 29 and the recording/reproducing coil 30 with the FPC 37. The leads may break when the legs of the erasing and recording/reproducing cores 24 and 25 are inserted into the coils 29 and 30 as shown in FIG. 6, when the erasing and recording/reproducing back bars 26 and 27 are joined, or when the molding resin 46 is poured as shown in FIG. 21. The lead breakage is a serious problem for a small composite magnetic head for use with 1.8-inch FDs.

Figure 22:
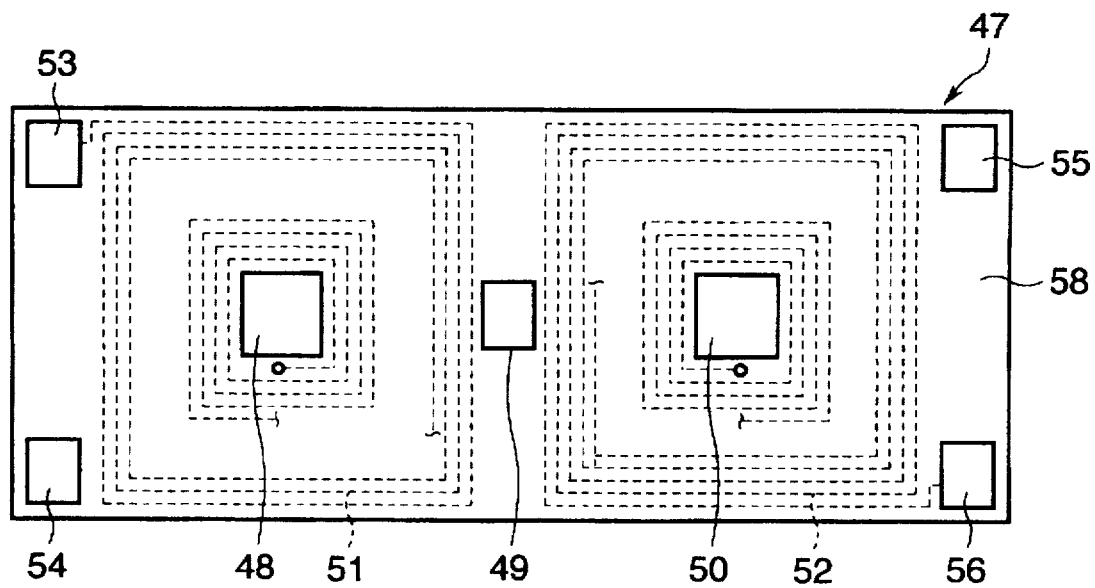
FIG. 22 is a plan view showing the configuration of the erasing coil and the recording/reproducing coil of a composite magnetic head according to a third embodiment of the present invention.
Figure 23:
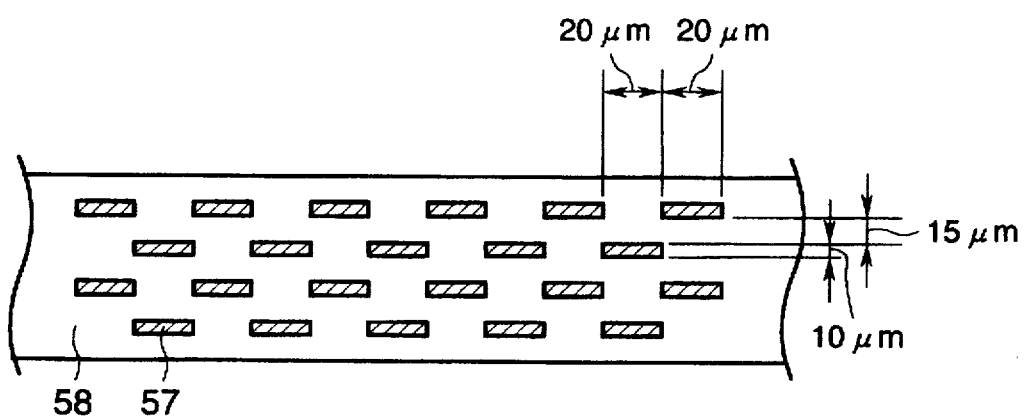
FIG. 23 is a cross sectional view showing the coil of the composite magnetic head according to the third embodiment.
Figure 24:
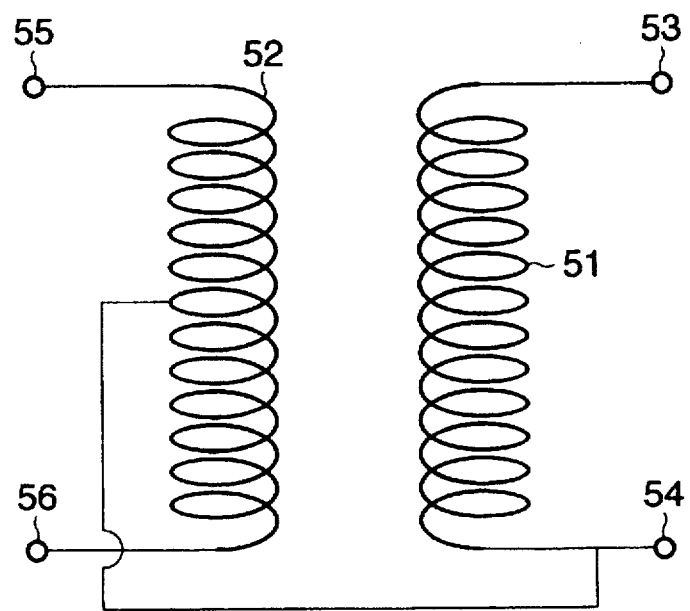
FIG. 24 shows the connection of the erasing coil and the recording/reproducing coil of the composite magnetic head according to the third embodiment.

FIG. 22 and FIG. 23 are a plan view and a fragmentary sectional view of a coil board of the composite magnetic head according to the third embodiment of the present invention, and FIG. 24 shows a connection diagram of the coil board.

In the figures, a reference numeral 47 denotes the coil board, 58 denotes an insulator, and 48, 49 and 50 are rectangular holes penetrating the insulator 58 of the coil board 47. Reference numerals 51 and 52 denote concentric coil patterns formed around the rectangular holes 48 and 50 respectively. The coil patterns 51 and 52 are conductors 57 about 20 [μm] wide and about 10 [μm] thick, formed by copper plating. Reference numerals 53 and 54 are terminals exposed on the surface of the insulator 58 that are connected to the outermost and innermost ends of the coil pattern 51 respectively. Reference numerals 55 and 56 are terminals exposed on the surface of the insulator 58 that are connected to the outermost and innermost ends of the coil trace 52 respectively. As shown in FIG. 24, a middle point of the coil pattern 52 is connected to the terminal 54 of the coil trace 51.

As shown in FIG. 6, the legs of the erasing core 24, the center core 26 and the recording/reproducing core 25 of the head chip 38 are inserted into the rectangular holes 48, 49 and 50 of the coil board 47 respectively. Then, the erasing and recording/reproducing back bars 27 and 28 are joined to close the magnetic circuits.

The coil patterns 51 and 52 are formed by repeating the steps of: applying a solution of photoresist on the insulator (insulation board) 58; producing the shape of the coil pattern on the photoresist through photolithography; forming the conductor 57 on the produced shape of the coil pattern by electroless copper plating, etching or other method, as shown in FIG. 23; depositing another layer of insulator on the surface; and forming another conductor 57 on the second layer of insulator so that it is connected to the conductor 57 on the lower layer via the through-hole.

In the third embodiment, the legs of the erasing core 24, the center core 26, and the recording/reproducing core 25 of the head chip are inserted into the rectangular holes 48, 49 and 50 penetrating the coil board 47 respectively, then the erasing and recording/reproducing back bars 27 and 28 are joined to close the magnetic circuits. So, the leads will never break.

Since the coil patterns 51 and 52 are formed by photolithography and plating or etching, the erasing and recording/ reproducing back bars 27 and 28 can be made thinner and can be incorporated into the FPC 37.

Fourth Embodiment

Figure 25:
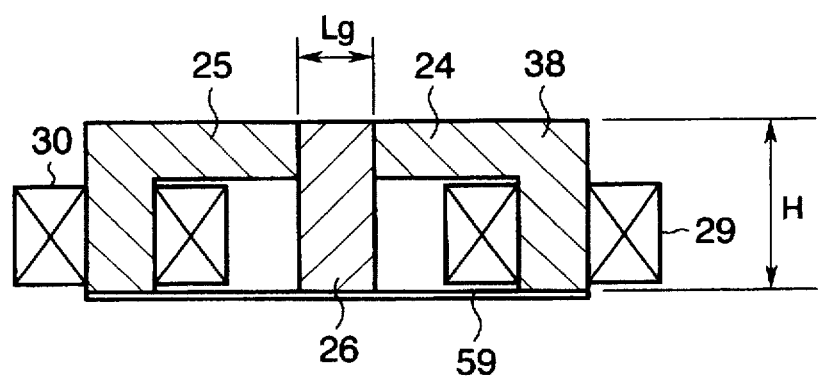
FIG. 25 is a cross sectional view showing a further composite magnetic head according to a fourth embodiment of the present invention.
Figure 26A:
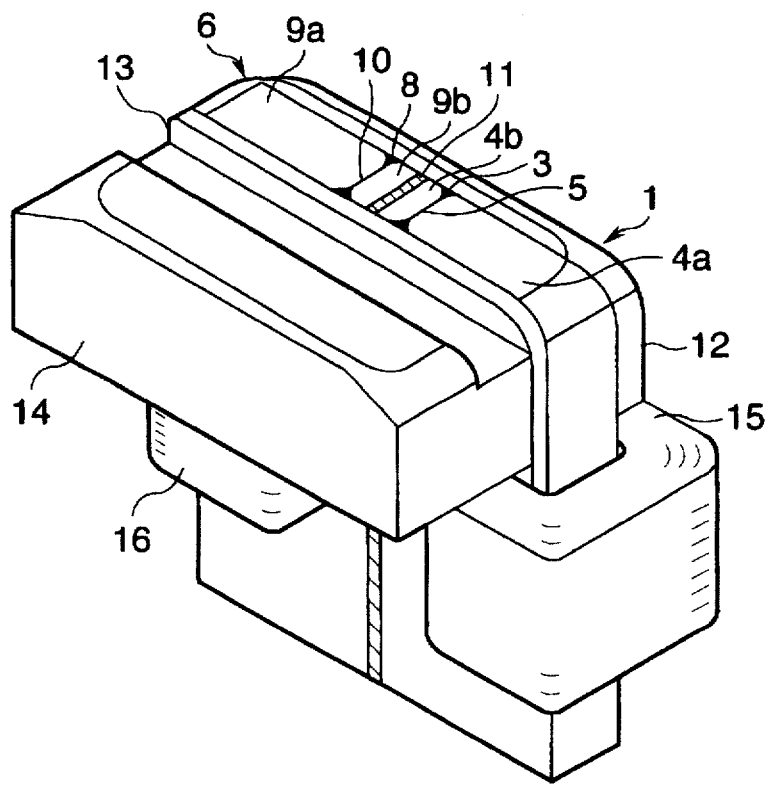
FIGS. 26A and 26B show a perspective view and a plan view indicating the structure of a conventional composite magnetic head.
Figure 26B:
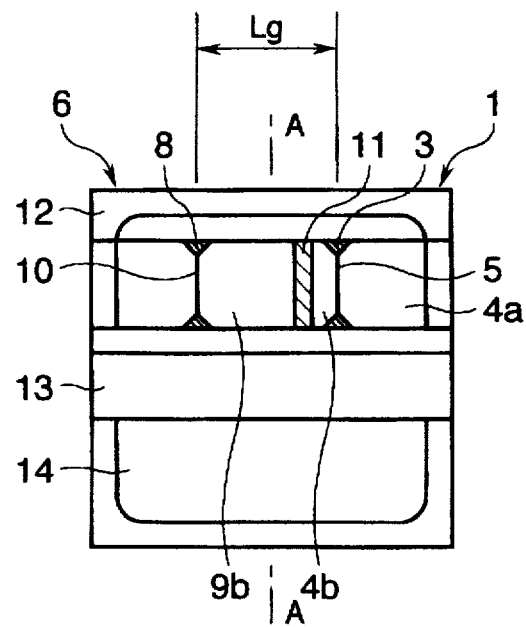
Figure 27:
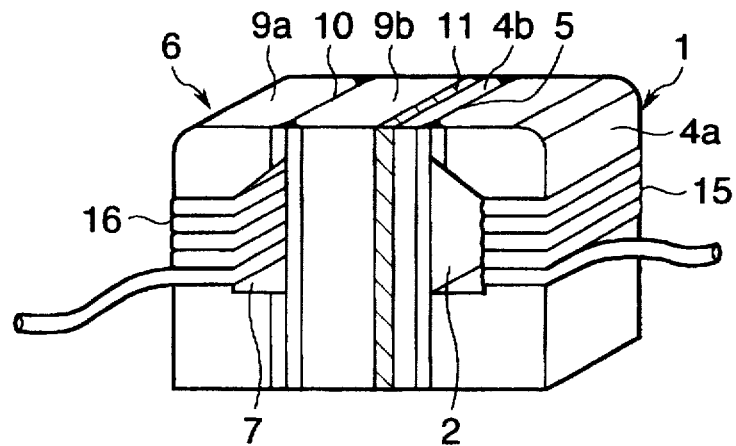
FIG. 27 is a perspective view showing a part of the composite magnetic head of FIGS. 26A and 26B.

FIG. 25 is a cross sectional view of a composite magnetic head according to a fourth embodiment of the present invention. In FIG. 25, a reference numeral 59 denotes a magnetic plate glued to the bottom surfaces of the erasing core 24, the recording/reproducing core 25 and the center core 26. The magnetic plate 59 is about 30 [μm] thick and is made of an amorphous alloy, major constituents of which are Co, Fe, Ni, B and Si. The head chip 38 including the erasing core 24, the recording/reproducing core 25, the center core 26, the erasing coil 29 and the recording/reproducing coil 30 are configured as shown in the first embodiment. The gap-to-gap distance $L_g$ and the head height H satisfies the conditional expressions (1) and (2) shown in the first embodiment.

The magnetic plate 59 has the following features. The first to third features (a), (b) and (c) are explained by the fact that the magnetic plate is made of an amorphous material. The fourth feature (d) is explained by the fact that the magnetic plate is made of a magnetic alloy.

(a) High permeability and low hysteresis loss due to absence of crystallomagnetic anisotropy.

(b) High electrical resistance and low eddy-current loss.

(c) High resistance to plastic deformation and high elasticity.

(d) Permeability 20 to 50 times higher than the permeability of ferrite.

Because of these features (a), (b) and (d) given above, the thin magnetic plate 59 has the same magnetic reluctance as the ferrite back bars 27 and 28 shown in FIG. 1. The composite magnetic head of the fourth embodiment can match the composite magnetic head of the first embodiment in terms of head output and noise level due to reproduction crosstalk.

The magnetic plate 59 is also a metal leaf with high flexibility and high elasticity as indicated in the feature (c) above. So, the magnetic plate 59 can be tightly joined to the head chip 38 having a flatness of around 10 [μm]. This structure is much easier to assemble than the sandwich structure of the first embodiment, in which two ferrite back bars are stuck on opposite sides of the head chip 38.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A composite magnetic head comprising:

a head chip including an erasing core for magnetically erasing data on a recording medium, a recording/reproducing core for magnetically recording and reproducing data on the recording medium, and a center core disposed between said erasing core and said recording/reproducing core, said erasing core being joined to said center core via a first nonmagnetic material which forms an erasing gap, and said recording/reproducing core being joined to said center core via a second nonmagnetic material which forms a recording/reproducing gap;

an erasing coil wound on said erasing core;

a recording/reproducing coil wound on said recording/reproducing core;

a first back bar for magnetically coupling said erasing core with said center core; and a second back bar for magnetically coupling said recording/reproducing core with said center core;

wherein said composite magnetic head satisfies both of following conditional expressions (1) and (2):

$$H \leq 0.058 + 8.6 \times L_g \quad \text{(expression 1)}$$

$$H \leq 0.41 + 5.9 \times L_g \quad \text{(expression 2)}$$

where $L_g$ denotes a gap-to-gap distance between said erasing gap and said recording/reproducing gap, and H denotes a head height which is a distance between a sliding surface of said head chip and surfaces of said first and second back bars facing in a direction opposite to a direction the sliding surface faces.

2. The composite magnetic head of claim 1 further comprising:

a holder for supporting said head chip; and a gimbal for supporting said holder so as to be able to slope said sliding surface of said head chip along a width direction of said head chip and a length direction perpendicular to said width direction.

3. The composite magnetic head of claim 2, wherein a surface of said holder opposite to the sliding surface has a flatness of not more than 10.

4. The composite magnetic head of claim 1, wherein said gap-to-gap distance $L_g$ is not more than 0.2 [mm], and said head height H is not more than 1.6 [mm].

5. A composite magnetic head comprising:

a head chip including an erasing core for magnetically erasing data on a recording medium, a recording/reproducing core for magnetically recording and reproducing data on the recording medium, and a center core disposed between said erasing core and said recording/reproducing core, said erasing core being joined to said center core via a first nonmagnetic material which forms an erasing gap, and said recording/reproducing core being joined to said center core via a second nonmagnetic material which forms a recording/reproducing gap;

an erasing coil wound on said erasing core;

a recording/reproducing coil wound on said recording/reproducing core;

a first back bar for magnetically coupling said erasing core with said center core;

a second back bar for magnetically coupling said recording/reproducing core with said center core; and a molding resin for filling a space surrounded by said head chip, said holder and said gimbal, and covering a part of said head chip, said erasing coil, said recording/reproducing coil, said first back bar and said second back bar, wherein said composite magnetic head satisfies both of following conditional expressions (1) and (2):

$$H < 0.058 + 8.6 \times L_g \quad \text{(expression 1)}$$

$$H < 0.41 + 5.9 \times L_g \quad \text{(expression 2)}$$

where $L_g$ a denotes a gap-to-gap distance between said erasing gap and said recording/reproducing gap, and H denotes a head height which is a distance between a sliding surface of said head chip and surfaces of said first and second back bars facing in a direction opposite to a direction the sliding surface faces.

6. The composite magnetic head of claim 4, wherein said molding resin is an epoxy resin compound, said epoxy resin compound containing:
at least one epoxy resin which is selected from the group consisting of materials represented by the following chemical structural formulae (1) to (4):

a ratio of weight of said hardener to weight of said epoxy resin being from 0.05 through 10, to 100;
a ratio of weight of said coupling agent to weight of said filler being from 0.05 through 5, to 100; and

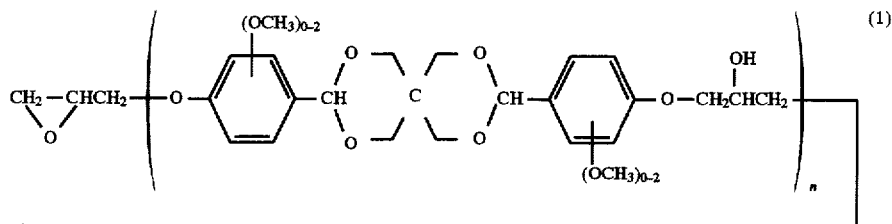

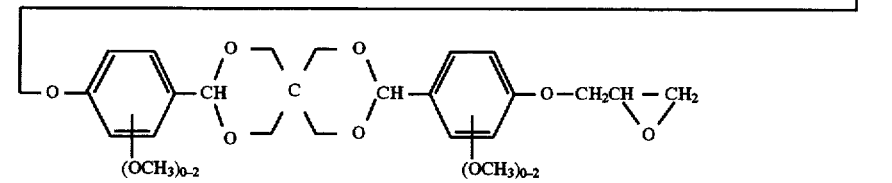

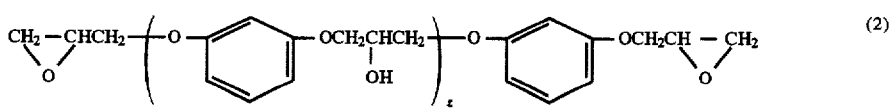

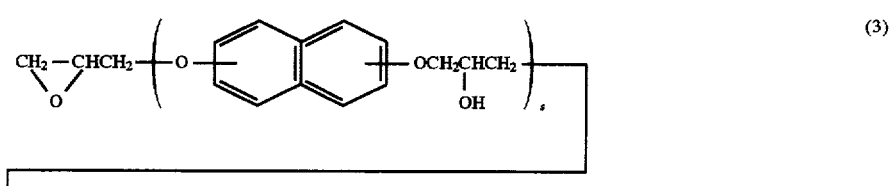

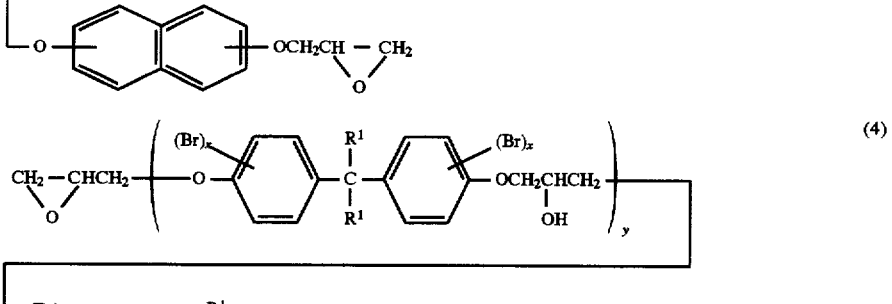

where n, z, and s in said formulae (1) to (3) are 0 or an integer from 1 to 4 on average, each $R^1$ is a hydrogen atom or a methyl group, each x is an integer from 1 to 4, and y is 0 or an integer from 1 to 4 on average;
an acid anhydride;
a hardener;
at least one coupling agent which is selected from the group consisting of epoxysilane coupling agent, phenyl aminosilane coupling agent, mercaptosilane coupling agent and titanate coupling agent; and
a filler which is selected from the group consisting of a silica filler and an alumina filler, said filler is composed of particles, an average diameter of which is not more than 60 [μm] and which include particles with a diameter of not more than 5 [μm] at a rate of at least 5[%] by weight;
a ratio of number of acid anhydride groups in said acid anhydride to number of epoxide groups in said epoxy resin being from 0.5 through 1.5;

a percentage of weight of said filler to weight of said molding resin being from 35[%] through 95[%].

7. A composite magnetic head comprising:
a head chip including an erasing core for magnetically erasing data on a recording medium, a recording/reproducing core for magnetically recording and reproducing data on the recording medium, and a center core disposed between said erasing core and said recording/reproducing core, said erasing core being joined to said center core via a first nonmagnetic material which forms an erasing gap, and said recording/reproducing core being joined to said center core via a second nonmagnetic material which forms a recording/reproducing gap;
an erasing coil wound on said erasing core;
a recording/reproducing coil wound on said recording/reproducing core;
a first back bar for magnetically coupling said erasing core with said center core; and a second back bar for magnetically coupling said recording/reproducing core with said center core;

wherein each of said erasing coils includes a plurality of first metal conductor loops each provided on insulator plates which are piled up to each other; and first conductor lines for connecting said first metal conductor loops to each other; and wherein each of said recording/reproducing coil includes a plurality of second metal conductor loops each provided on said insulator plates; and second conductor lines for connecting said second metal conductor loops to each other.

8. The composite magnetic head of claim 7, wherein said insulator plates have a first penetrating hole passing through an inside of said first metal conductor loops, a second penetrating hole passing through an inside of said second metal conductor loops, and a third penetrating hole passing through between said first metal conductor loops and said second metal conductor loops.

9. A composite magnetic head comprising:

a head chip including an erasing core for magnetically erasing data on a recording medium, a recording/reproducing core for magnetically recording and reproducing data on the recording medium, and a center core disposed between said erasing core and said recording/reproducing core, said erasing core being joined to said center core via a first nonmagnetic material which forms an erasing gap, and said recording/reproducing core being joined to said center core via a second nonmagnetic material which forms a recording/reproducing gap;

an erasing coil wound on said erasing core;

a recording/reproducing coil wound on said recording/reproducing core;

a first back bar for magnetically coupling said erasing core with said center core; and a second back bar for magnetically coupling said recording/reproducing core with said center core.

wherein said first and second back bars are made of an amorphous alloy, wherein said composite magnetic head satisfies both of following conditional expressions (1) and (2):

$$H \leq 0.058 + 8.6 \times L_g \quad \text{(expression 1)}$$

$$H \leq 0.41 + 5.9 \times L_g \quad \text{(expression 2)}$$

where $L_g$ denotes a gap-to-gap distance between said erasing gap and said recording/reproducing gap, and H denotes a head height which is a distance between a sliding surface of said head chip and surfaces of said first and second back bars facing in a direction opposite to a direction the sliding surface faces.

10. The composite magnetic head of claim 9, wherein said amorphous alloy is 10 [μm] to 50 [μm] thick, and includes Co, Fe, Ni, Mo, B and Si as major constitutes.

* * * * *

UNITED STATES PATENT AND TRADEMARK OFFICE
CERTIFICATE OF CORRECTION

PATENT NO. : 5,790,353
DATED : August 4, 1998
INVENTOR(S) : Hiroshi MIWA et al.

It is certified that error appears in the above-identified patent and that said Letters Patent is hereby corrected as shown below:

Claim 3, line 3, after "10" insert --[µm]--.

Signed and Sealed this

Twenty-third Day of March, 1999

Attest:

Q. TODD DICKINSON

Attesting Officer

Acting Commissioner of Patents and Trademarks